United States Patent
Kamimura et al.

(10) Patent No.: US 10,207,372 B2
(45) Date of Patent: Feb. 19, 2019

(54) ALUMINUM COMPOSITE MATERIAL AND METHOD FOR MANUFACTURING ALUMINUM COMPOSITE MATERIAL

(71) Applicants: NIPPON LIGHT METAL COMPANY, LTD., Tokyo (JP); NIKKEIKIN ALUMINIUM CORE TECHNOLOGY CO., LTD., Tokyo (JP)

(72) Inventors: Yusuke Kamimura, Shizuoka (JP); Shingo Koizumi, Shizuoka (JP); Daisuke Nagasawa, Shizuoka (JP); Toshiaki Yamazaki, Tokyo (JP)

(73) Assignees: Nippon Light Metal Company, Ltd., Tokyo (JP); Nikkeikin Aluminum Core Technology Co., Ltd., Tokyo (JP)

( * ) Notice: Subject to any disclaimer, the term of this patent is extended or adjusted under 35 U.S.C. 154(b) by 0 days.

(21) Appl. No.: 14/913,637

(22) PCT Filed: Aug. 15, 2014

(86) PCT No.: PCT/JP2014/071497
§ 371 (c)(1),
(2) Date: Feb. 22, 2016

(87) PCT Pub. No.: WO2015/025805
PCT Pub. Date: Feb. 26, 2015

(65) Prior Publication Data
US 2016/0199948 A1 Jul. 14, 2016

(30) Foreign Application Priority Data

Aug. 23, 2013 (JP) ................................. 2013-173959

(51) Int. Cl.
B22F 7/04 (2006.01)
B23K 35/28 (2006.01)
(Continued)

(52) U.S. Cl.
CPC .............. *B23K 35/286* (2013.01); *B22F 3/12* (2013.01); *B22F 3/18* (2013.01); *B22F 5/006* (2013.01);
(Continued)

(58) Field of Classification Search
None
See application file for complete search history.

(56) References Cited

U.S. PATENT DOCUMENTS 5,700,962 A * 12/1997 Carden ............... C22C 32/0057
252/478
7,625,520 B2 * 12/2009 Peng ........................ C22C 1/05
419/10
(Continued)

FOREIGN PATENT DOCUMENTS

JP 62-012895 A 1/1987
JP 62-12899 A 1/1987
(Continued)

OTHER PUBLICATIONS

International Search Report PCT/JP2014/071497 dated Sep. 9, 2014 with English translation.
Notice of Rejection Japanese Patent Application No. 2015-532843 dated Jun. 21, 2016 with full English translation.

*Primary Examiner* — Seth Dumbris
(74) *Attorney, Agent, or Firm* — McDermott Will & Emery LLP

(57) ABSTRACT

An aluminum composite material includes a first metallic plate, a second metallic plate, and a matrix material that is interposed between the first metallic plate and the second metallic plate and is formed of aluminum powder. Gadolinium oxide particles are dispersed in the matrix material.

3 Claims, 12 Drawing Sheets

(51) Int. Cl.
*B22F 3/12* (2006.01)
*B22F 5/00* (2006.01)
*B23K 35/02* (2006.01)
*B22F 3/18* (2006.01)
*C22C 21/00* (2006.01)
*G21F 1/08* (2006.01)
*C22C 32/00* (2006.01)

(52) U.S. Cl.
CPC ............ *B22F 7/04* (2013.01); *B23K 35/0244* (2013.01); *C22C 21/00* (2013.01); *C22C 32/00* (2013.01); *G21F 1/08* (2013.01); *B22F 2998/10* (2013.01); *C22C 32/0036* (2013.01)

(56) References Cited

U.S. PATENT DOCUMENTS

2002/0021779 A1    2/2002  Murakami et al.
2009/0214886 A1*  8/2009  Ishii .......................... B22F 3/18
                                                             428/556

FOREIGN PATENT DOCUMENTS

| | | |
|---|---|---|
| JP | 62-177141 A | 8/1987 |
| JP | 62-243733 A | 10/1987 |
| JP | 63-038553 A | 2/1988 |
| JP | 2002-022880 A | 1/2002 |
| JP | 2010-255032 A | 11/2010 |

* cited by examiner

SAMPLE 1
(Al+6%Gd$_2$O$_3$)

SAMPLE 2
(Al+12%Gd$_2$O$_3$)

SAMPLE 3
(Al+15%Gd$_2$O$_3$)

SAMPLE 4
(Al+30%Gd$_2$O$_3$)

SAMPLE 6
(Al+4%Gd$_2$O$_3$+10%B$_4$C)

SAMPLE 7
(Al+10%Gd$_2$O$_3$+10%B$_4$C)

SAMPLE 9
(Al+2%Gd$_2$O$_3$+20%B$_4$C)

SAMPLE 10
(Al+8%Gd$_2$O$_3$+20%B$_4$C)

SAMPLE 11
(Al+20%Gd$_2$O$_3$+20%B$_4$C)

SAMPLE 12
(Al+30%B$_4$C)

ALUMINUM COMPOSITE MATERIAL AND METHOD FOR MANUFACTURING ALUMINUM COMPOSITE MATERIAL

CROSS-REFERENCE TO RELATED APPLICATIONS

This application is a National Stage of PCT International Application No. PCT/JP2014/071497 filed on Aug. 15, 2014 which designates the United States, incorporated herein by reference, and which is based upon and claims the benefit of priority from Japanese Patent Application No. 2013-173959 filed on Aug. 23, 2013, the entire contents of which are incorporated herein by reference.

FIELD

The present invention relates to an aluminum composite material and a method for manufacturing an aluminum composite material.

BACKGROUND

Alloys disclosed in Patent Literature 1, Patent Literature 2, Patent Literature 3, and Patent Literature 4 are known as materials having neutron absorbing power.

CITATION LIST

Patent Literature

Patent Literature 1: Japanese Patent Application Laid-open No. S62-177141
Patent Literature 2: Japanese Patent Application Laid-open No. S62-243733
Patent Literature 3: Japanese Patent Application Laid-open No. S63-038553
Patent Literature 4: U.S. Pat. No. 7,625,520

SUMMARY

Technical Problem

When an aluminum composite material having neutron absorbing power used for, for example, containment vessels for radioactive substances is manufactured, the aluminum composite material that does not have characteristics (workability) suitable for the manufacture of articles may cause failures in smoothly manufacturing the articles and degrade the performance of the articles.

An object of an aspect of the present invention is to provide an aluminum composite material having neutron absorbing power and good workability and a method for manufacturing an aluminum composite material.

Solution to Problem

According to an aspect of the present invention, an aluminum composite material includes a first metallic plate, a second metallic plate; and a matrix material that is interposed between the first metallic plate and the second metallic plate and is formed of aluminum powder. Gadolinium oxide particles are dispersed in the matrix material.

In the aspect of the present invention, the gadolinium oxide particles are dispersed in the matrix material formed of the aluminum powder, and therefore an aluminum composite material having neutron absorbing power and good workability is provided. The first metallic plate and the second metallic plate that interpose the matrix material therebetween are provided, and therefore an aluminum composite material having desired strength is provided.

According to an aspect of the present invention, the matrix material may contain the gadolinium oxide particles in an amount of 6% by mass or more and 30% by mass or less. With this aspect, an aluminum composite material having neutron absorbing power and good workability is provided.

According to an aspect of the present invention, the matrix material may contain the gadolinium oxide particles in an amount of 6% by mass or more and 30% by mass or less, the aluminum composite material may have a percentage elongation of 8% or more, and when a curvature radius and a thickness that cause no fracture in a 90-degree bending test are R and Da, respectively, the aluminum composite material may have formability represented by a minimum value of a ratio R/Da of 2.3 or more and 6.0 or less. With this aspect, an aluminum composite material having neutron absorbing power and good workability is provided.

According to an aspect of the present invention, boron carbide particles may be further dispersed in the matrix material. With this aspect, an aluminum composite material having good balance among characteristics such as neutron absorbing power, workability, and manufacturing costs.

According to an aspect of the present invention, boron carbide particles may be further dispersed in the matrix material, and the matrix material may contain the gadolinium oxide particles in an amount of 2% by mass or more and 10% by mass or less and may contain the boron carbide particles in an amount of 10% by mass or more and 20% by mass or less. With this aspect, an aluminum composite material having neutron absorbing power and good workability is provided.

According to an aspect of the present invention, boron carbide particles may be further dispersed in the matrix material, the matrix material may contain the gadolinium oxide particles in an amount of 2% by mass or more and 20% by mass or less and may contain the boron carbide particles in an amount of 10% by mass or more and 20% by mass or less, and the aluminum composite material may have a percentage elongation of 2% or more. With this aspect, an aluminum composite material having neutron absorbing power and good workability is provided.

According to an aspect of the present invention, boron carbide particles may be further dispersed in the matrix material, the matrix material may contain the gadolinium oxide particles in an amount of 2% by mass or more and 10% by mass or less and may contain the boron carbide particles in an amount of 10% by mass or more and 20% by mass or less, the aluminum composite material may have a percentage elongation of 6% or more, and when a curvature radius and a thickness that cause no fracture in a 90-degree bending test are R and Da, respectively, the aluminum composite material may have formability represented by a minimum value of a ratio R/Da of 4.5 or more and 7.5 or less. With this aspect, an aluminum composite material having neutron absorbing power and good workability is provided.

According to an aspect of the present invention, at least either the first metallic plate or the second metallic plate may be formed of aluminum or stainless steel. With this aspect, an aluminum composite material having corrosion-resistance and desired strength is provided.

According to an aspect of the present invention, a method for manufacturing an aluminum composite material, the method includes mixing aluminum powder and gadolinium oxide particles with each other, forming a body to be rolled by filling a mixed material formed at the mixing into a case, heating the body to be rolled, and manufacturing an aluminum composite material by rolling the heated body to be rolled.

In the aspect of the present invention, the aluminum powder and the gadolinium oxide particles are mixed to form the mixed material and the mixed material is filled into a case and rolled, whereby an aluminum composite material in which the gadolinium oxide particles are uniformly dispersed in the aluminum powder can be manufactured. With this aspect, an aluminum composite material having neutron absorbing power and good workability can be manufactured.

According to an aspect of the present invention, the mixing may be performed so as to cause the mixed material to contain the gadolinium oxide particles in an amount of 6% by mass or more and 30% by mass or less. With this aspect, an aluminum composite material having neutron absorbing power and good workability can be manufactured.

According to an aspect of the present invention, the mixing may include further mixing boron carbide particles. With this aspect, an aluminum composite material having good balance among characteristics such as neutron absorbing power, workability, and manufacturing costs can be manufactured.

According to an aspect of the present invention, the mixing may include further mixing boron carbide particles, and the mixing may be performed so as to cause the mixed material to contain the gadolinium oxide particles in an amount of 2% by mass or more and 20% by mass or less and to contain the boron carbide particles in an amount of 10% by mass or more and 20% by mass or less. With this aspect, an aluminum composite material having neutron absorbing power and good workability can be manufactured.

According to an aspect of the present invention, the case may include a first case and a second case, and the forming a body to be rolled may include filling the mixed material into a recess of the first case and covering an opening of the recess filled with the mixed material with the second case. With this aspect, the mixed material can smoothly be filled into the case.

An aspect of the present invention may include tapping the first case at the filling of the mixed material into the first case. With this aspect, a filling density of the mixed material in the first case can be increased.

According to an aspect of the present invention, the mixed material may be filled into the first case so as to place an upper face of the mixed material filled into the recess of the first case and an upper face of the first case on a perimeter of the recess on the same plane. With this aspect, after filling the mixed material into the first case, the first case and the second case can smoothly be joined together.

Advantageous Effects of Invention

The aspects according to the present invention can provide an aluminum composite material having neutron absorbing power and good workability.

DESCRIPTION OF EMBODIMENTS

Although the following describes an embodiment according to the present invention with reference to the drawings, the present invention is not limited thereto. Components of the embodiment described below can appropriately be combined with each other. Some components are not necessarily used. The components of the embodiment described below include components that can easily be thought of by those skilled in the art and substantially the same components, that is, components in what is called the scope of equivalence.

[Structure of Aluminum Composite Material]

Figure 1:
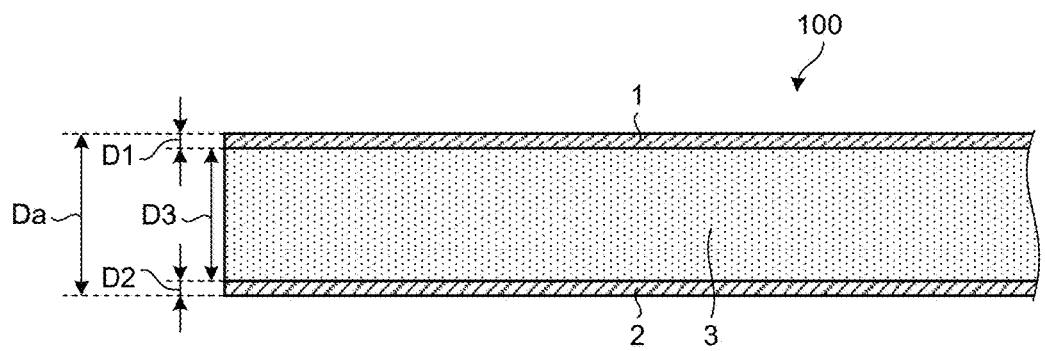
FIG. 1 is a sectional view of an example of an aluminum composite material according to the present embodiment.

FIG. 1 is a schematic sectional view of an example of an aluminum composite material 100 according to the present embodiment. In the present embodiment, the aluminum is a concept containing one or both of pure aluminum and an aluminum alloy.

In FIG. 1, the aluminum composite material 100 includes a metallic plate 1, a metallic plate 2, and a matrix material 3 interposed between the metallic plate 1 and the metallic plate 2. One surface of the matrix material 3 and the metallic plate 1 are in contact with each other, whereas the other surface of the matrix material 3 opposite to the one surface and the metallic plate 2 are in contact with each other. The matrix material 3 is interposed between the metallic plate 1 and the metallic plate 2. The matrix material 3 may be called a core material 3. The metallic plate 1 and the metallic plate 2 may be called a skin material 1 and a skin material 2, respectively.

The matrix material 3 is formed of aluminum powder, and particles having neutron absorbing power are dispersed in the matrix material 3. The neutron absorbing power includes the function of impeding transmission of neutrons. In the present embodiment, gadolinium oxide particles are dispersed in the matrix material 3. Gadolinium oxide ($Gd_2O_3$) is a material having neutron absorbing power. In the present embodiment, the matrix material 3 may contain the gadolinium oxide particles in an amount of 6% by mass or more and 30% by mass or less. The matrix material 3 may be formed of the aluminum powder and the gadolinium oxide particles. When the matrix material 3 is formed of the aluminum powder and the gadolinium oxide particles, the matrix material 3 may be formed of the gadolinium oxide particles in an amount of 6% by mass or more and 30% by mass or less and the remainder being the aluminum powder.

Furthermore, boron carbide particles may be dispersed in the matrix material 3. Boron carbide ($B_4C$) is a material having neutron absorbing power. In the present embodiment, the matrix material 3 may contain the gadolinium oxide particles in an amount of 2% by mass or more and 20% by mass or less and contain the boron carbide particles in an amount of 10% by mass or more and 20% by mass or less. The matrix material 3 may contain the gadolinium oxide particles in an amount of 2% by mass or more and 10% by mass or less and contain the boron carbide particles in an amount of 10% by mass or more and 20% by mass or less. The matrix material 3 may be formed of the aluminum powder, the gadolinium oxide particles, and the boron carbide particles. When the matrix material 3 is formed of the aluminum powder, the gadolinium oxide particles, and the boron carbide particles, the matrix material 3 may be formed of the gadolinium oxide particles in an amount of 2% by mass or more and 10% by mass or less, the boron carbide particles in an amount of 10% by mass or more and 20% by mass or less, and the remainder being the aluminum powder.

In the following description, one or both of the gadolinium oxide particles and the boron carbide particles having neutron absorbing power will be appropriately called neutron absorbing particles.

Both the metallic plate 1 and the metallic plate 2 are formed of aluminum. Both the metallic plate 1 and the metallic plate 2 may be formed of stainless steel. One of the metallic plate 1 and the metallic plate 2 may be formed of aluminum, whereas the other may be formed of stainless steel.

A thickness Da of the aluminum composite material 100 is the sum of a thickness D1 of the metallic plate 1, a thickness D2 of the metallic plate 2, and a thickness D3 of the matrix material 3. In the present embodiment, the sum (D1+D2) of the thickness D1 of the metallic plate 1 and the thickness D2 of the metallic plate 2 is set to 15% or more and 25% or less of the thickness Da of the aluminum composite material 100.

[Description of Raw Materials]

(Aluminum Powder)

The following describes the aluminum powder of the matrix material 3. The aluminum powder forming the matrix material 3 may be formed of an aluminum alloy stipulated in A1100 (AA1100 by AA Standard) by JIS, for example. In the present embodiment, the aluminum powder is formed of a material having a composition including 0.95% by mass or less of the sum of silicon (Si) and iron (Fe), 0.05% by mass to 0.20% by mass of copper (Cu), 0.05% by mass or less of manganese (Mn), 0.10% by mass or less of zinc (Zn), and the remainder being aluminum and inevitable impurities.

The composition of the aluminum powder is not limited to the above composition. The aluminum powder may be formed of at least one alloy of pure aluminum (JIS 1050, JIS 1070, for example), an Al—Cu alloy (JIS 2017, for example), an Al—Mg—Si alloy (JIS 6061, for example), an Al—Zn—Mg alloy (JIS 7075, for example), and an Al—Mn alloy, for example.

The composition of the aluminum powder may be determined in consideration of required characteristics, forming workability, an amount of particles to be mixed, raw material costs, or the like. When workability or heat dissipation capability of the aluminum composite material 100 is required to be increased, for example, the aluminum powder is preferably pure aluminum powder. The pure aluminum powder is more advantageous in raw material costs than aluminum alloy powder. The pure aluminum powder is preferably powder with a purity of 99.5% by mass or more.

An upper limit value of an average particle diameter of the aluminum powder is, for example, 200 μm or less, preferably 100 μm or less, and more preferably 30 μm or less. A lower limit value of the average particle diameter of the aluminum powder is, for example, 0.5 μm or more and preferably 10 μm or more. The average particle diameter of the aluminum powder can be arbitrary so long as it is manufacturable. Used in the present embodiment is the aluminum powder having an average particle diameter of 0.5 μm or more and 200 μm or less and preferably 10 μm or more and 30 μm or less.

The average particle diameter of the aluminum powder is 100 μm or less, whereas the average particle diameter of the neutron absorbing particles (one or both of the gadolinium oxide particles and the boron carbide particles) is 30 μm or less, so that the neutron absorbing particles are uniformly dispersed in the matrix material 3 and the matrix material 3 has a smaller part in which the concentration of the neutron absorbing particles is low, which stabilizes the characteristics of the aluminum composite material 100.

If the difference between the average particle diameter of the aluminum powder and the average particle diameter of the neutron absorbing particles is large, fractures are highly likely to occur in the matrix material 3 in rolling described below. For this reason, the difference between the average particle diameter of the aluminum powder and the average particle diameter of the neutron absorbing particles is preferably small.

If the average particle diameter of the aluminum powder is excessively large, the aluminum powder and the neutron absorbing particles are highly likely to be difficult to be uniformly mixed with each other. In contrast, if the average particle diameter of the aluminum powder is excessively small, flocculation is likely to occur among particles of the aluminum powder, and the aluminum powder and the neutron absorbing particles are highly likely to be difficult to be uniformly mixed with each other. The average particle diameter of the aluminum powder is defined to the above range, so that excellent workability, formability, and mechanical characteristics can be obtained.

The average particle diameter of the aluminum powder indicates a value by a laser diffraction method for measuring particle size distribution. The average particle diameter of the aluminum powder may be measured by "Microtrac" manufactured by Nikkiso Co., Ltd., for example. The average particle diameter is a volume-based median diameter. The shape of the aluminum powder can be any shape. The shape of the aluminum powder may be any shape such as a tear drop shape, a spherical shape, a spheroidal shape, a flake-like shape, or an indefinite shape. The average particle diameter of the gadolinium oxide particles, the average particle diameter of the boron carbide particles, and average particle diameters of other particles described below can also be measured by a similar method.

The aluminum powder can be manufactured in accordance with known methods for manufacturing metallic powder. A method for manufacturing the aluminum powder is not limited. Examples of the method for manufacturing the aluminum powder include an atomization process, a melt spinning process, a rotating disk process, a rotating electrode process, and other quenching solidification processes. From the viewpoint of industrial production, the atomization process is preferable, and a gas atomization process is more preferable.

In the atomization process, atomization is preferably performed by normally heating molten metal to 700° C. or more and 1,200° C. or less. Setting this temperature range can lead to more effective atomization. A spray medium and atmosphere during atomization may be air, nitrogen, argon, helium, carbon dioxide, water, or any mixture thereof. The spray medium is preferably air, a nitrogen gas, or an argon gas from the viewpoint of economy.

(Gadolinium Oxide Particles)

The following next describes the gadolinium oxide particles dispersed in the matrix material 3. Gadolinium oxide ($Gd_2O_3$) has neutron absorbing power and the gadolinium oxide particles are dispersed in the matrix material 3, thereby causing the aluminum composite material 100 to function as a neutron absorbing material.

The gadolinium oxide particles are preferably contained in the aluminum powder in an amount of 6.0% by mass or more and 30.0% by mass or less. If the amount is less than 6% by mass, the matrix material 3 is highly likely not to have sufficient neutron absorbing power. In contrast, if the amount exceeds 30% by mass, the problem that a formed body is brittle and is likely to break is highly likely to occur. In addition, bonding between the aluminum powder and the gadolinium oxide particles degrades, voids are likely to occur, required functions are not acquired, and strength or thermal conductivity is also highly likely to degrade. Furthermore, machinability as the aluminum composite material 100 is also highly likely to degrade.

The average particle diameter of the gadolinium oxide particles may be arbitrary, and the difference between the average particle diameter of the aluminum powder and the average particle diameter of the gadolinium oxide particles is appropriately determined in accordance with required specifications. In the present embodiment, the average particle diameter of the gadolinium oxide particles is 1 μm or more and 30 μm or less. If the average particle diameter of the gadolinium oxide particles exceeds 30 μm, the problem that a cutting tool immediately wears when cutting or the like is highly likely to occur. In contrast, if the average particle diameter of the gadolinium oxide particles is less than 1 μm, flocculation is likely to occur among the minute gadolinium oxide particles, and the aluminum powder and the gadolinium oxide particles are highly likely to be difficult to be uniformly mixed with each other.

The average particle diameter of the gadolinium oxide particles indicates a value by a laser diffraction method for measuring particle size distribution. The shape of the gadolinium oxide particles is also not limited and may be any shape such as a tear drop shape, a spherical shape, a spheroidal shape, a flake-like shape, or an indefinite shape.

(Boron Carbide Particles)

The following next describes the boron carbide particles. In the present embodiment, not only the gadolinium oxide particles but also the boron carbide particles may be dispersed in the matrix material 3 formed of the aluminum powder. Boron carbide ($B_4C$) has neutron absorbing power, and the gadolinium oxide particles and the boron carbide particles are dispersed in the matrix material 3, thereby causing the aluminum composite material 100 to function as a neutron absorbing material.

When the aluminum powder contains the gadolinium oxide particles in an amount of 2% by mass or more and 20% by mass or less, the boron carbide particles are preferably contained in an amount of 10% by mass or more and 20% by mass or less. If the amount of the boron carbide particles is less than 10% by mass, the matrix material 3 is highly likely not to have sufficient neutron absorbing power. In contrast, if the amount of the boron carbide particles exceeds 20% by mass, the problem that a formed body is brittle and is likely to break is highly likely to occur. When the aluminum powder contains the boron carbide particles in an amount of 10% by mass or more and 20% by mass or less, the gadolinium oxide particles may be contained in an amount of 2% by mass or more and 10% by mass or less.

The average particle diameter of the boron carbide particles may be arbitrary, and the difference between the average particle diameter of the aluminum powder and the average particle diameter of the boron carbide particles is appropriately determined in accordance with required specifications. In the present embodiment, the average particle diameter of the boron carbide particles is 1 μm or more and 30 μm or less. If the average particle diameter of the boron carbide particles exceeds 30 μm, the problem that a cutting tool immediately wears when cutting or the like is highly likely to occur. In contrast, if the average particle diameter of the boron carbide particles is less than 1 μm, flocculation is likely to occur among the minute boron carbide particles, and therefore the aluminum powder and the boron carbide particles are highly likely to be difficult to be uniformly mixed with each other.

The average particle diameter of the boron carbide particles indicates a value by a laser diffraction method for measuring particle size distribution. The shape of the boron carbide particles is also not limited and may be any shape such as a tear drop shape, a spherical shape, a spheroidal shape, a flake-like shape, or an indefinite shape.

The matrix material 3 may or may not contain the boron carbide particles. The matrix material 3 may contain other particles in addition to the gadolinium oxide particles. Examples of the particles contained in the matrix material 3 include ceramic particles. Examples of the ceramics contained in the matrix material 3 include $Al_2O_3$, SiC, BN, aluminum nitride, and silicon nitride, in addition to $B_4C$. These ceramics are used in the form of powder, can be used singly or as a mixture, and are selected in accordance with uses of the composite material.

Boron (B) has neutron absorbing power, and using boron-based ceramic particles enables the aluminum composite material 100 to be used as a neutron absorbing material. In that case, examples of the boron-based ceramic material include $TiB_2$, $B_2O_3$, FeB, and $FeB_2$, in addition to $B_4C$ described above. These boron-based ceramics are used in the form of powder and can be used singly or as a mixture. Boron carbide $B_4C$ rich in $^{10}B$, which is an isotope of B that absorbs neutrons well, is in particular preferably used. Average particle diameters of these ceramic particles may be arbitrary, which is preferably 1 μm or more and 30 μm or less and more preferably 5 μm or more and 20 μm or less.

When neutron absorbing power is required to be further added to the matrix material 3, in other words, when neutron transmittance is required to be reduced, the aluminum powder may be doped with at least one element having neutron absorbing power such as hafnium (Hf), samarium (Sm), or gadolinium (Gd). When high-temperature strength is required, the aluminum powder may be doped with at least one of titanium (Ti), vanadium (V), chromium (Cr), manganese (Mn), magnesium (Mg), iron (Fe), copper (Cu), nickel (Ni), molybdenum (Mo), niobium (Nb), zirconium (Zr), strontium (Sr), or the like. When room-temperature strength is required, the aluminum powder may be doped with at least one of silicon (Si), iron (Fe), copper (Cu), magnesium (Mg), zinc (Zn), or the like.

[Method of Manufacture]

The following next describes an example of a method for manufacturing the aluminum composite material 100 according to the present embodiment. The following describes an example in which the matrix material 3 is formed of the aluminum powder and the gadolinium oxide particles.

Figure 2:
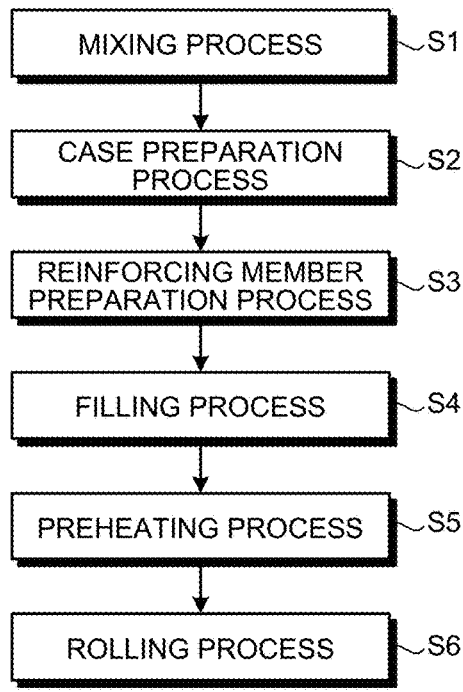
FIG. 2 is a flowchart illustrating an example of a method for manufacturing an aluminum composite material according to the present embodiment.

As illustrated in the flowchart in FIG. 2, the method for manufacturing the aluminum composite material 100 according to the present embodiment includes a mixing process (Step S1) that mixes the aluminum powder and the gadolinium oxide particles to form a mixed material M, a case preparation process (Step S2) that prepares a case 10 into which the mixed material M formed at the mixing process is filled, a reinforcing member preparation process (Step S3) that prepares a reinforcing member 16 for reinforcing the case 10, a filling process (Step S4) that fills the mixed material M formed at the mixing process into the case 10 to form a body to be rolled 18, a preheating process (Step S5) that heats the body to be rolled 18, and a rolling process (Step S6) that rolls the heated body to be rolled 18 to manufacture the aluminum composite material 100.

(Step S1: Mixing Process)

The aluminum powder and the gadolinium oxide particles are prepared and are uniformly mixed with each other. The aluminum powder may be only one type of aluminum powder or a mixture of a plurality of types of aluminum powders. At the mixing process, mixing is performed so that the mixed material M formed of the aluminum powder and the gadolinium oxide particles will contain the gadolinium oxide particles in an amount of 6% by mass or more and 30% by mass or less. A method for mixing the aluminum powder and the gadolinium oxide particles may be any known method; using any type of mixer such as a V blender or a cross rotary mixer, a vibration mill, a satellite mill, or the like, the mixing may be performed for a certain period of time, for example. In the present embodiment, a mixing time is 10 minutes or more and 10 hours or less and preferably 3 hours or more and 6 hours or less. The mixing may be performed in a dry manner or a wet manner. During the mixing, polishing media such as alumina or SUS balls may be appropriately added for the purpose of crushing.

The mixed material M formed by mixing the aluminum powder and the gadolinium oxide particles at the mixing process is sent to the next step without any further treatment.

(Step S2: Case Preparation Process)

Figure 3:
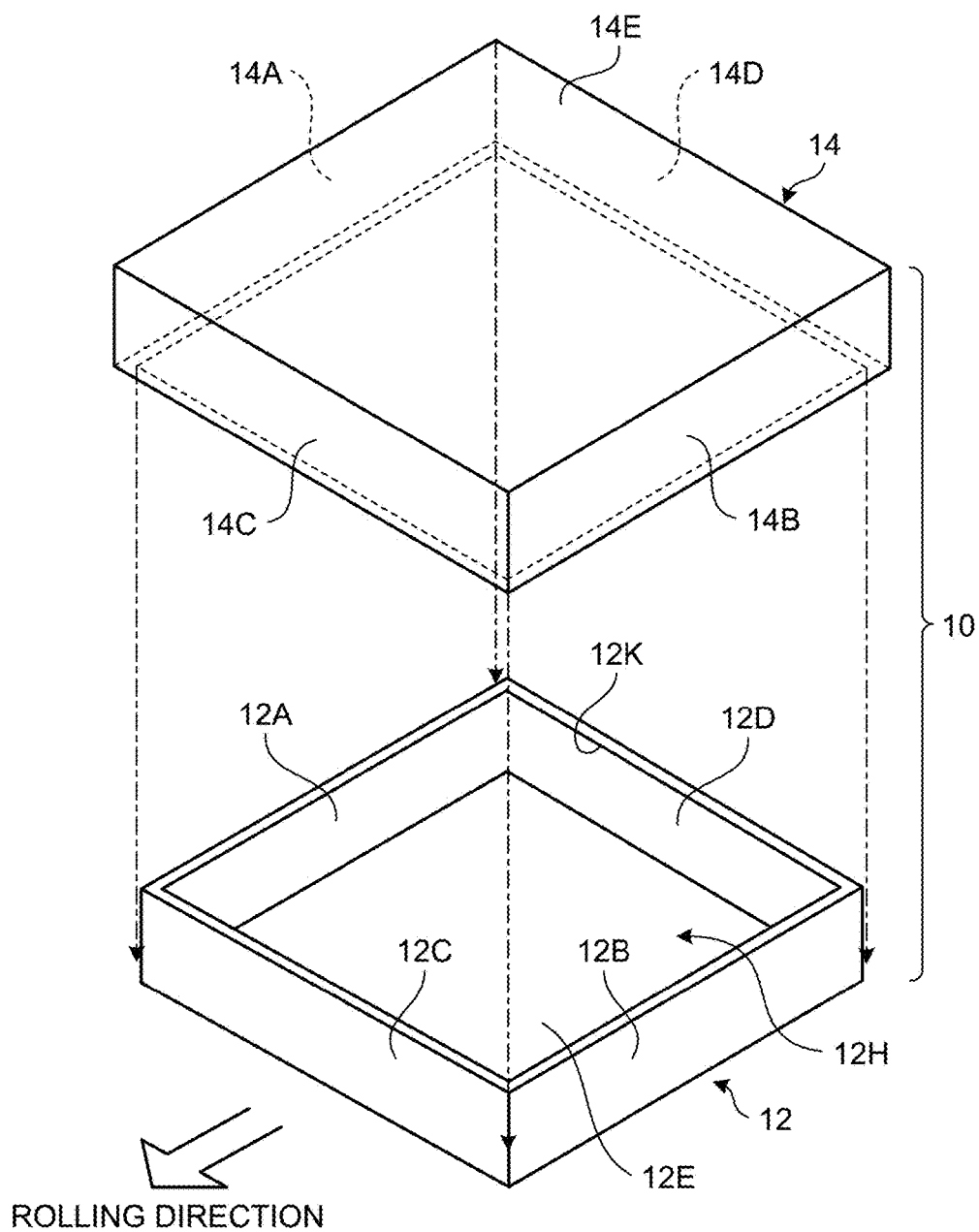
FIG. 3 is a perspective view of an example of a case used in the method for manufacturing an aluminum composite material according to the present embodiment.
Figure 4:
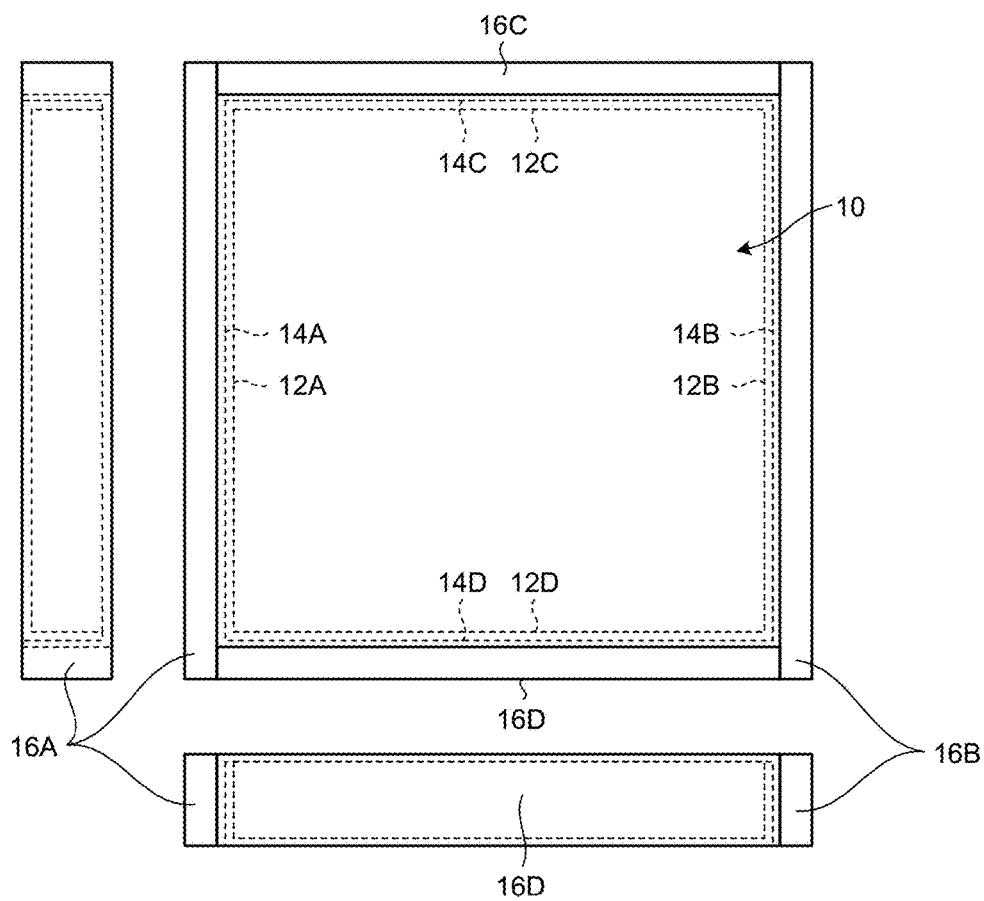
FIG. 4 is a diagram illustrating an example of the case and a reinforcing member used in the method for manufacturing an aluminum composite material according to the present embodiment.
Figure 5:
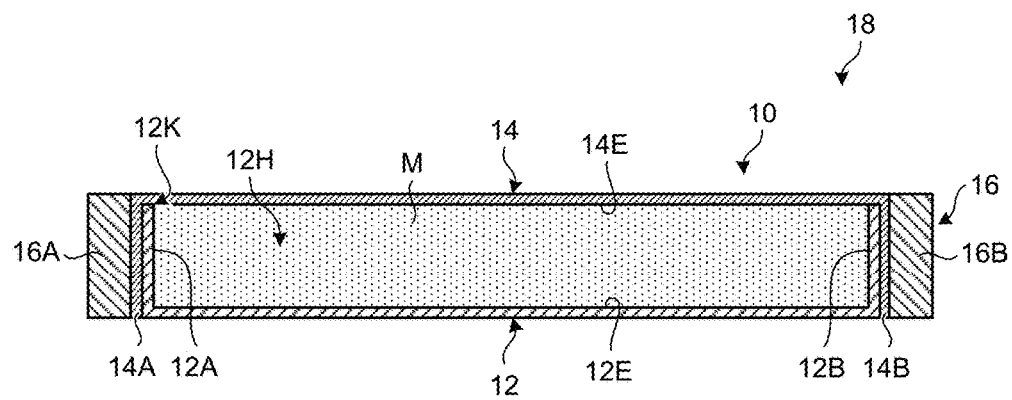
FIG. 5 is a sectional view of an example of a body to be rolled.

At the case preparation process, the case 10 is prepared, which is hollow, flat, and formed of metal, and into which the mixed material M formed at the mixing process is filled. FIG. 3 is an exploded perspective view of an example of the case 10. FIG. 4 is a diagram illustrating an example of a structure of the case 10. FIG. 5 is a sectional view of an example of the body to be rolled 18 including the case 10 and the mixed material M filled into the case 10.

The case 10 is preferably formed of aluminum or stainless steel. For the case 10 formed of aluminum, for example, pure aluminum (JIS 1050, JIS 1070, for example) is preferably used. Examples of the material forming the case 10 include various types of alloy materials such as an Al—Cu alloy (JIS 2017, for example), an Al—Mg alloy (JIS 5052, for example), an Al—Mg—Si alloy (JIS 6061, for example), an Al—Zn—Mg alloy (JIS 7075, for example), and an Al—Mn alloy.

What composition of aluminum is selected may be determined in consideration of required characteristics, costs, or the like. When workability or heat dissipation capability is required to be increased, for example, the case 10 is preferably formed of the pure aluminum. The pure aluminum is more advantageous in terms of raw material costs than aluminum alloys. When the strength or workability of the case 10 is further required to be increased, the case 10 is preferably formed of the Al—Mg alloy (JIS 5052, for example). When neutron absorbing power is further required to be increased, the case 10 may be doped with at least one element having neutron absorbing power such as Hf, Sm, or Gd in an amount of 1 to 50% by mass.

In the present embodiment, the case 10 includes a lower case (a first case) 12 and an upper case (a second case) 14. At the case preparation process, the lower case 12 and the upper case 14 are prepared. The lower case 12 and the upper case 14 are formed of the same material, which is aluminum in the present embodiment. As illustrated in FIG. 3, FIG. 4, and FIG. 5, the lower case 12 includes a side plate 12A, a side plate 12B facing the side plate 12A, a front plate 12C, a rear plate 12D facing the front plate 12C, and a bottom plate 12E. The upper case 14 includes a side plate 14A, a side plate 14B facing the side plate 14A, a front plate 14C, a rear plate 14D facing the front plate 14C, and a top plate 14E.

The lower case 12 is formed in a top-opened, bottomed, rectangular parallelepipedal shape and has a recess 12H to be filled with the mixed material M. The upper case 14 is formed in a substantially rectangular parallelepipedal shape and functions as a blocking member that blocks the opened upper face of the lower case 12. The upper case 14 has dimensions slightly larger than those of the lower case 12 and is fit so as to cover the perimeter of the lower case 12 from above the lower case 12. The upper case 14 is arranged so as to cover an opening 12K on the upper end of the recess 12H filled with the mixed material M.

(Step S3: Reinforcing Member Preparation Process)

The reinforcing member (a reinforcing frame) 16 for reinforcing the perimeter of the case 10 is prepared. The reinforcing member 16 is arranged in order to reinforce an outer peripheral face of the case 10 at the rolling process. During rolling of the case 10, the case 10 is arranged so that the longitudinal direction (when the planar shape of the case 10 is a square, any central axial line) of the case 10 will be directed to a rolling direction and that an extension surface thereof will be directed to the horizontal direction.

The side plate 14A and the side plate 14B of the upper case 14 are arranged in the rolling direction, whereas the front plate 14C and the rear plate 14D are arranged in a direction orthogonal to the rolling direction. The reinforcing member 16 includes a first reinforcing member 16A connected to the side plate 14A, a second reinforcing member 16B connected to the side plate 14B, a third reinforcing member 16C connected to the front plate 14C, and a fourth reinforcing member 16D connected to the rear plate 14D.

The first reinforcing member 16A is mounted on the side plate 14A, whereas the second reinforcing member 16B is mounted on the side plate 14B. In the first reinforcing member 16A, both ends of the first reinforcing member 16A extend in the front-and-rear direction beyond the side plate 14A with respect to the rolling direction. In the second reinforcing member 16B, both ends of the second reinforcing member 16B extend in the front-and-rear direction beyond the side plate 14B with respect to the rolling direction.

The third reinforcing member 16C is mounted on the front plate 14C, whereas the fourth reinforcing member 16D is mounted on the rear plate 14D. The third reinforcing member 16C has the same length as that of the front plate 14C with respect to the direction orthogonal to the rolling direction, whereas the fourth reinforcing member 16D has the same length as that of the rear plate 14D with respect to the direction orthogonal to the rolling direction.

(Step S4: Filling Process)

Next, the mixed material M formed at the mixing process is filled into the recess 12H of the lower case 12. The filling process includes uniformly charging work of the mixed material M. In the filling work (uniformly charging work) of the mixed material M to the lower case 12, the lower case 12 is tapped. The tapping includes treatment that taps the lower case 12. The tapping may be performed in parallel with at least part of the uniformly charging work or may be performed after the uniformly charging work. The tapping can increase a filling density of the mixed material M in the lower case 12. The tapping is performed so that a theoretical filling ratio of the mixed material M will be within the range of 35% to 65%.

Figure 6:
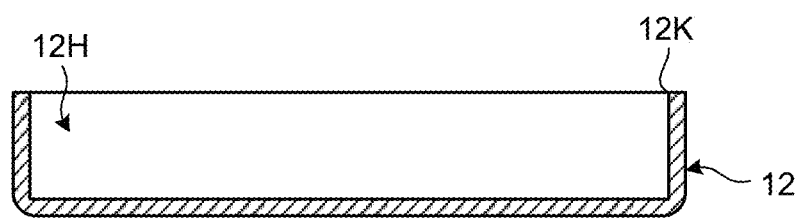
FIG. 6 is a diagram for illustrating an example of the method for manufacturing an aluminum composite material according to the present embodiment, the diagram illustrating an example in which a first case is prepared.
Figure 7:
FIG. 7 is a diagram for illustrating an example of the method for manufacturing an aluminum composite material according to the present embodiment, the diagram illustrating a state in which the first case and an extension sleeve are stacked with each other.

FIG. 6 through FIG. 13 are diagrams illustrating an example of the filling process that forms the body to be rolled 18. As illustrated in FIG. 6, the lower case 12 is arranged at a certain filling position so that the opening 12K of the recess 12H will be directed upward. Next, as illustrated in FIG. 7, an extension sleeve 20 is arranged on the lower case 12 so that the extension sleeve 20 and the lower case 12 will be stacked with each other. With the extension sleeve 20 and the lower case 12 stacked with each other, the extension sleeve 20 includes a sleeve main body 20A and a skirt 20B. The sleeve main body 20A has a lower face that can be in intimate contact with an upper face 12J of the lower case 12 on the perimeter of the recess 12H. The skirt 20B is formed so as to protrude outward from the lower face of the sleeve main body 20A and is externally fit to the lower case 12 with the lower face of the sleeve main body 20A and the upper face 12J of the lower case 12 being in contact with each other.

Figure 8:
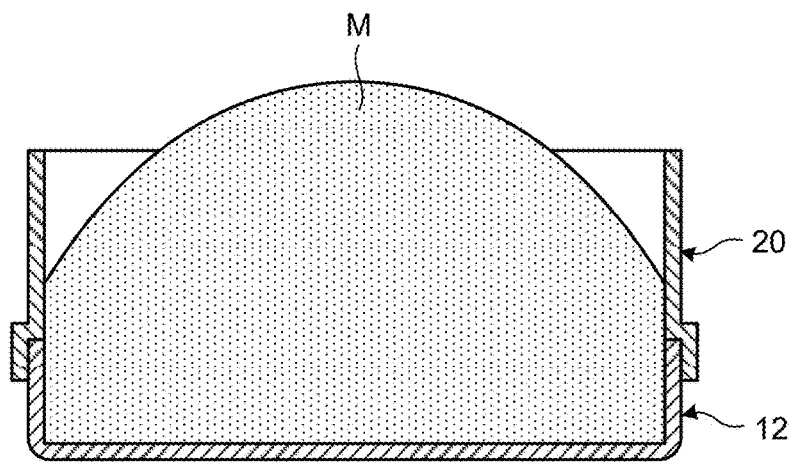
FIG. 8 is a diagram for illustrating an example of the method for manufacturing an aluminum composite material according to the present embodiment, the diagram illustrating a state in which a mixed material has been charged into a space formed by the first case and the extension sleeve.
Figure 9:
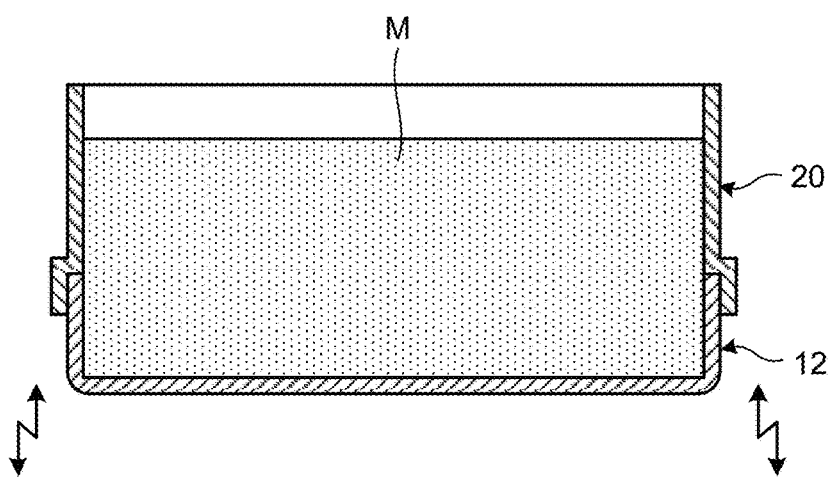
FIG. 9 is a diagram for illustrating an example of the method for manufacturing an aluminum composite material according to the present embodiment, the diagram illustrating a state in which the mixed material has been charged into the space formed by the first case and the extension sleeve and tapping has been performed.

With the extension sleeve 20 thus stacked on the lower case 12, the mixed material M is charged into the space formed by the lower case 12 and the extension sleeve 20 as illustrated in FIG. 8.

In the present embodiment, with the mixed material M charged into the space formed by the lower case 12 and the extension sleeve 20, the lower case 12 and the extension sleeve 20 are tapped. In other words, one or both of the lower case 12 and the extension sleeve 20 are tapped. Consequently, as illustrates in FIG. 9, the filling density of the mixed material M increases in the space formed by the lower case 12 and the extension sleeve 20, and an upper face of the mixed material M descends.

Figure 10:
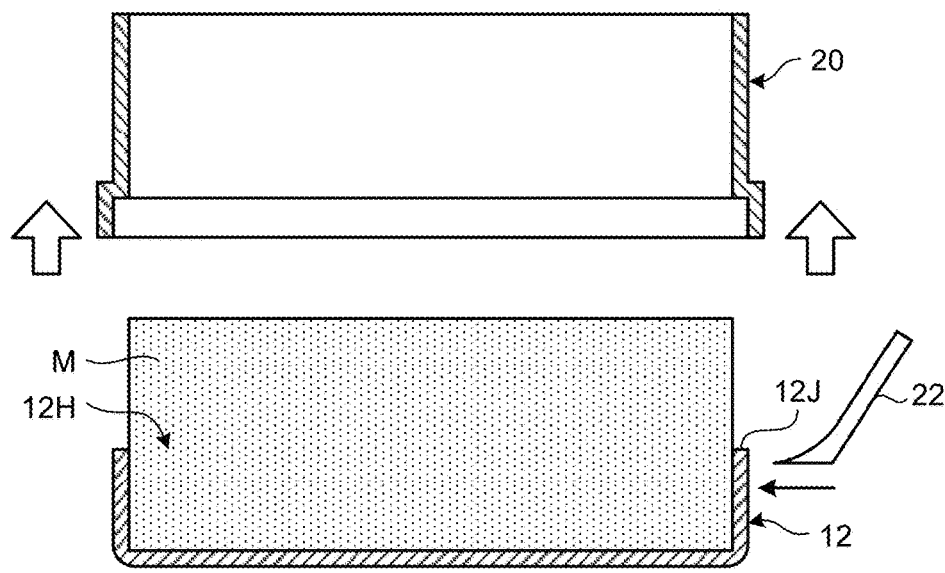
FIG. 10 is a diagram for illustrating an example of the method for manufacturing an aluminum composite material according to the present embodiment, the diagram illustrating a state in which the extension sleeve has been removed from the first case.

After a certain period of tapping time has elapsed, when the filling density of the mixed material M reaches a required filling density, the tapping is stopped, and the extension sleeve 20 is lifted upward and is removed from the lower case 12. Consequently, as illustrated in FIG. 10, the mixed material M is arranged in the recess 12H of the lower case 12, and part of the mixed material M that was present within the extension sleeve 20 is arranged so as to protrude above the lower case 12.

Figure 11:
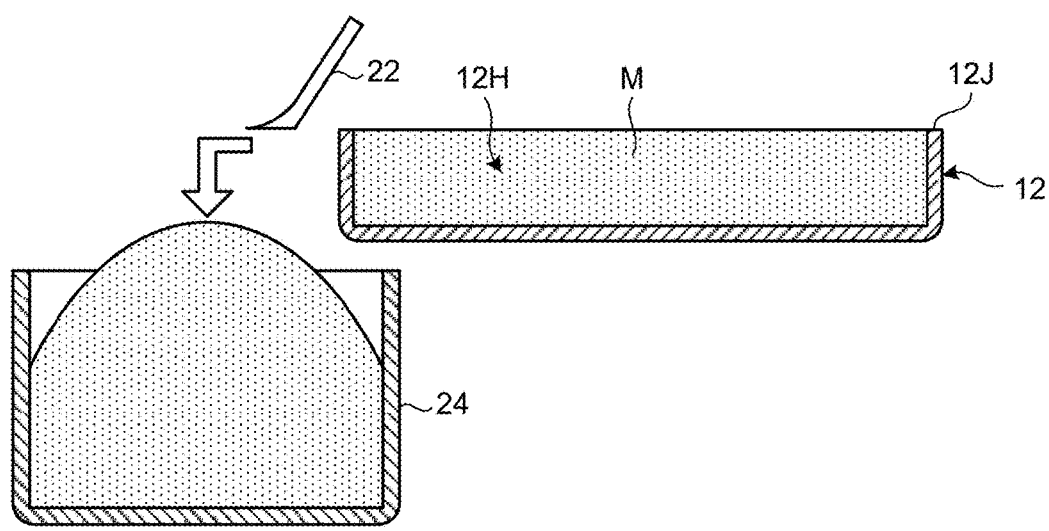
FIG. 11 is a diagram for illustrating an example of the method for manufacturing an aluminum composite material according to the present embodiment, the diagram illustrating a state in which at least part of the mixed material in the first case has been collected.

Subsequently, a scraper 22 is moved along the upper face 12J of the lower case 12, thereby scraping the part of the mixed material M protruding above the lower case 12 and collecting the mixed material M that has been scraped to a collection box 24 as illustrated in FIG. 11. The mixed material M that has been collected to the collection box 24 is returned to the blender, is stirred again, and is reused.

The part of the mixed material M is scraped, thereby causing the recess 12H of the lower case 12 to be fully filled with the mixed material M having a high filling density. In the present embodiment, the upper face of the mixed material M filled into the recess 12H of the lower case 12 and the upper face 12J of the lower case 12 on the perimeter of the recess 12H are placed on the same plane (are flush with each other).

Figure 12:
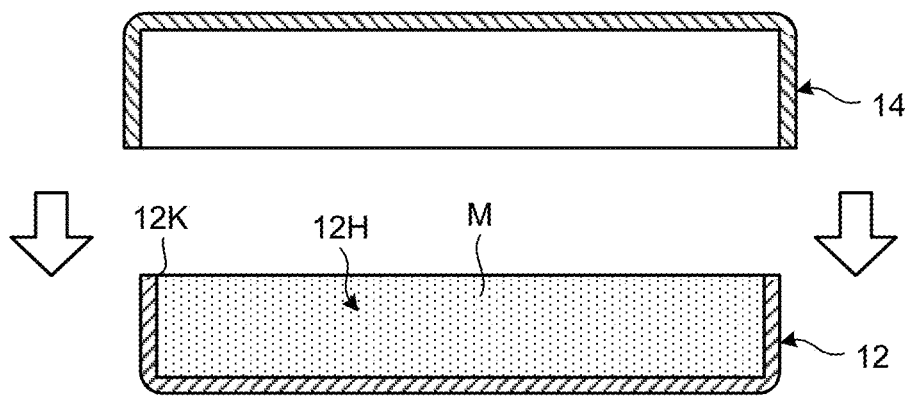
FIG. 12 is a diagram for illustrating an example of the method for manufacturing an aluminum composite material according to the present embodiment, the diagram illustrating a state in which an opening of the first case has been covered with a second case.
Figure 13:
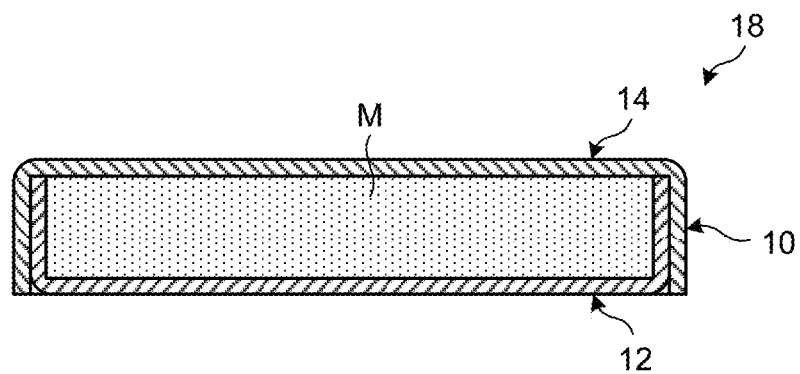
FIG. 13 is a diagram for illustrating an example of the method for manufacturing an aluminum composite material according to the present embodiment, the diagram illustrating a state in which the mixed material has been filled inside a case and a body to be rolled has been formed.
Figure 14:
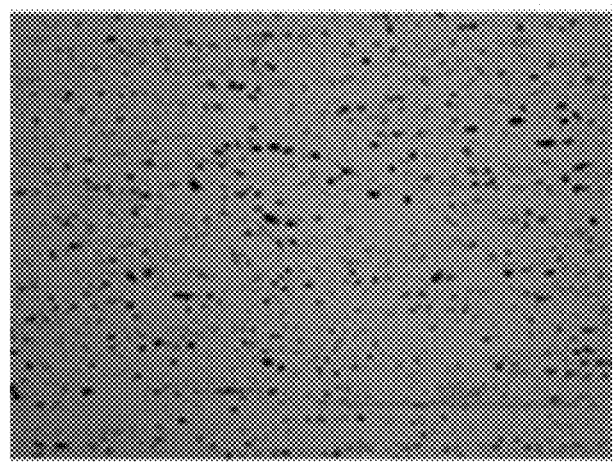
FIG. 14 is a photograph of an example of a matrix material according to working examples.
Figure 15:
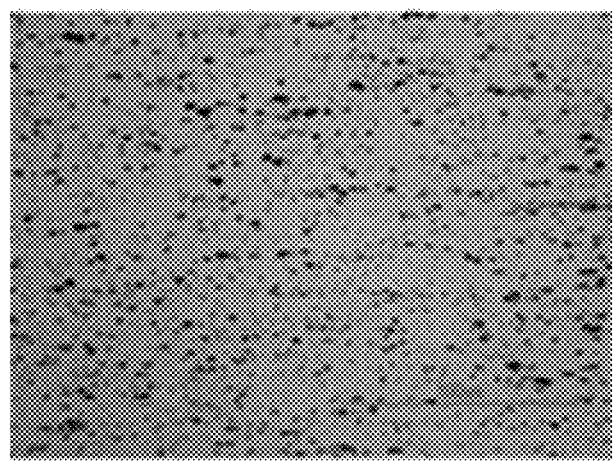
FIG. 15 is a photograph of an example of the matrix material according to the working examples.
Figure 16:
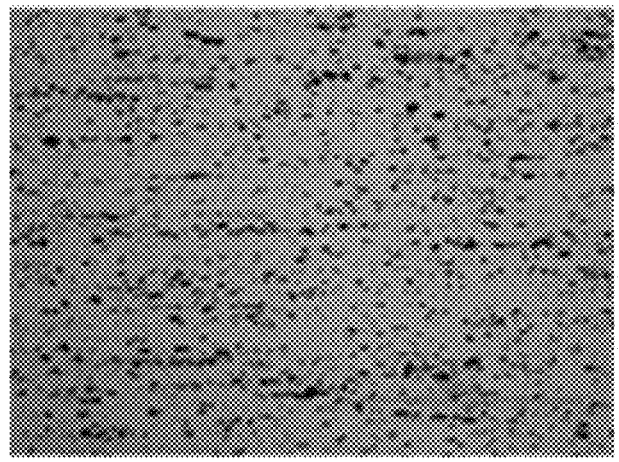
FIG. 16 is a photograph of an example of the matrix material according to the working examples.
Figure 17:
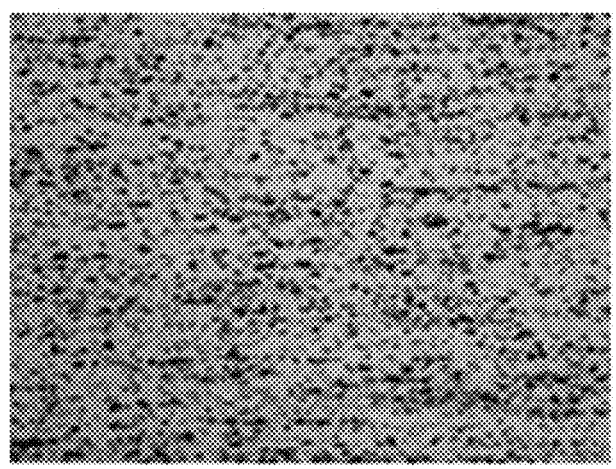
FIG. 17 is a photograph of an example of the matrix material according to the working examples.
Figure 18:
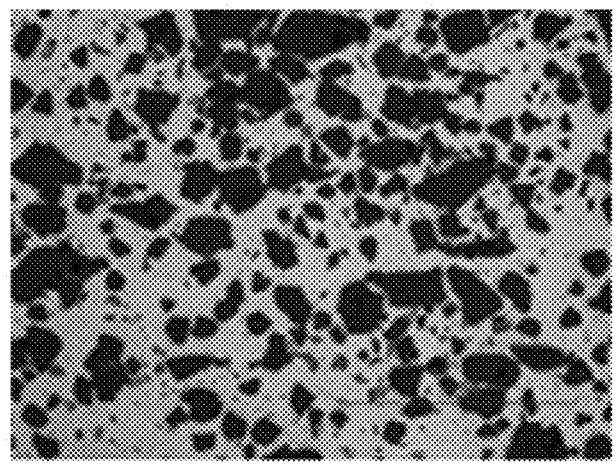
FIG. 18 is a photograph of an example of the matrix material according to the working examples.
Figure 19:
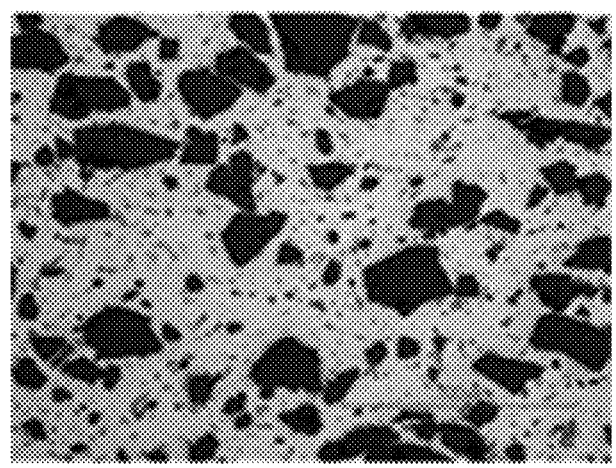
FIG. 19 is a photograph of an example of the matrix material according to the working examples.
Figure 20:
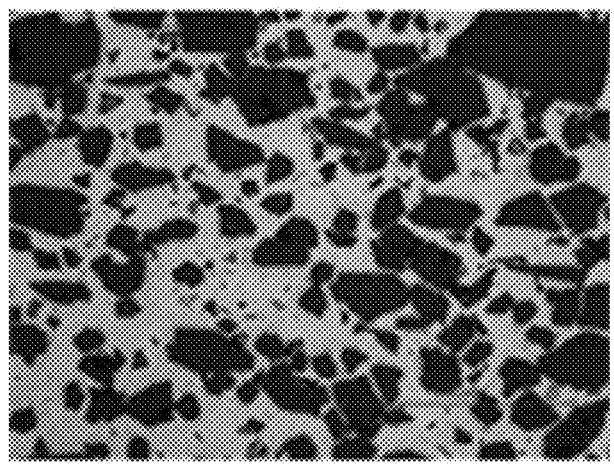
FIG. 20 is a photograph of an example of the matrix material according to the working examples.
Figure 21:
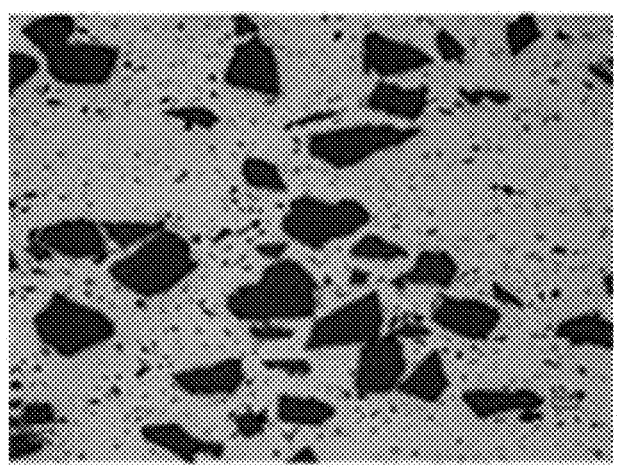
FIG. 21 is a photograph of an example of the matrix material according to the working examples.
Figure 22:
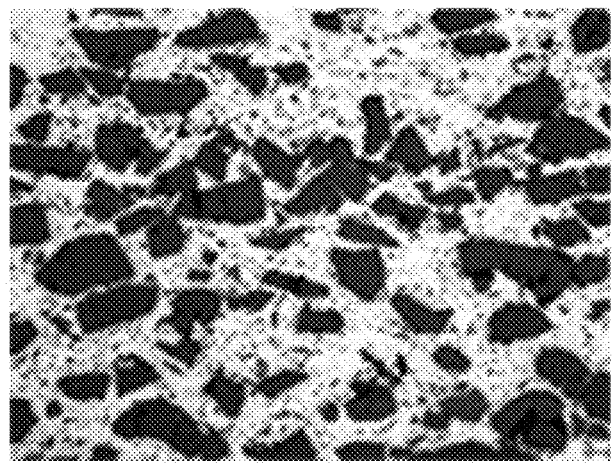
FIG. 22 is a photograph of an example of the matrix material according to the working examples.
Figure 23:
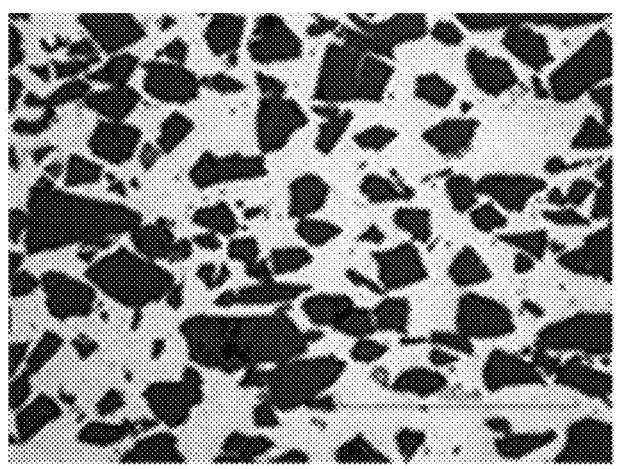
FIG. 23 is a photograph of an example of a matrix material according to comparative examples.

Subsequently, as illustrated in FIG. 12, the upper case 14 and the lower case 12 are fit to each other, and the opening 12K of the recess 12H filled with the mixed material M is covered with the upper case 14. As illustrated in FIG. 13, with the opening 12K of the lower case 12 blocked, the body to be rolled 18 in which the case 10 is fully filled with the mixed material M is formed.

The state of the body to be rolled 18 illustrated in FIG. 13 has a significant meaning as a "raw material" (meaning a raw material to be rolled at the rolling process described below) for manufacturing the aluminum composite material 100 according to the present embodiment. Although details will be described below, in a three-layer clad structure to be obtained by rolling the body to be rolled 18, the bottom plate 12E of the lower case 12 defines a lowermost layer (a skin layer), the mixed material M defines an intermediate layer (a core layer), and the top plate 14E of the upper case 14 defines an uppermost layer (a skin layer).

In order for the three-layer clad structure to exhibit sufficient mechanical characteristics, the adjacent layers are required to be in intimate contact with each other. In the present embodiment, the lower face of the mixed material M and the upper face of the bottom plate 12E of the lower case 12 are in intimate contact with each other across the entire faces, whereas the upper face of the mixed material M and the lower face of the top plate 14E of the upper case 14 are in intimate contact with each other across the entire faces. In the present embodiment, the adjacent layers being in intimate contact with each other are rolled, and in the three-layer clad structure after the rolling, the layers are firmly joined together. Consequently, the mechanical strength of the aluminum composite material 100 of the three-layer clad structure is sufficiently ensured.

Next, work of reinforcing the body to be rolled 18 with the reinforcing member 16 is performed. As illustrated in FIG. 5, the reinforcing work includes surrounding the perimeter of the body to be rolled 18 except both upper and lower faces in an attitude during the rolling with the reinforcing member 16.

In other words, the first reinforcing member 16A is temporarily mounted on the side plate 14A of the upper case 14, whereas the second reinforcing member 16B is temporarily mounted on the side plate 14B of the upper case 14. The first reinforcing member 16A and the second reinforcing member 16B are temporarily mounted so that both ends of the first reinforcing member 16A will extend beyond the side plate 14A and that both ends of the second reinforcing member 16B will extend beyond the side plate 14B with respect to the rolling direction. Next, the third reinforcing member 16C is temporarily mounted on the front plate 14C of the upper case 14, whereas the fourth reinforcing member 16D is temporarily mounted on the rear plate 14D of the upper case 14. The third reinforcing member 16C is temporarily mounted so that one end of the third reinforcing member 16C will be in contact with an end of the first reinforcing member 16A and that the other end of the third reinforcing member 16C will be in contact with an end of the second reinforcing member 16B with respect to the direction orthogonal to the rolling direction. The fourth reinforcing member 16D is temporarily mounted so that one end of the fourth reinforcing member 16D will be in contact with an end of the first reinforcing member 16A and that the other end of the fourth reinforcing member 16D will be in contact with an end of the second reinforcing member 16B with respect to the direction orthogonal to the rolling direction.

With the reinforcing member 16 thus temporarily mounted on the body to be rolled 18, the body to be rolled 18 is arranged in a vacuum furnace, which is evacuated at a certain degree of vacuum to be degassed.

After the degassing work ends, the temporarily mounted reinforcing member 16 is secured to the body to be rolled 18 by MIG welding. The MIG welding is performed by welding an upper edge of the reinforcing member 16 and an upper edge of the upper case 14 over the entire perimeter and welding a lower edge of the reinforcing member 16 and a lower edge of the upper case 14 over the entire perimeter. The lower edge of the upper case 14 and a lower edge of the lower case 12 is tightly adjacent to each other. Consequently, at the time the lower edge of the reinforcing member 16 and the lower edge of the upper case 14 are welded together, the lower edge of the lower case 12 is also welded together, and consequently, the case 10 is sealed in an airtight manner as a whole.

The case 10 is sealed in an airtight manner, and when air is present (remains) within the body to be rolled 18, it may remain as a defect. For this reason, in order for air to escape from the inside of the body to be rolled 18 and not to remain thereinside at the rolling process, air vents (not illustrated) may be formed at four corners of the upper face of the upper case 14, or the welding may partially be performed to form some gaps in the casing. An effect of removing gases that entered the body to be rolled 18 during the welding can also be expected by the formation of the vents or gaps.

(Step S5: Preheating Process)

The body to be rolled 18 reinforced with the reinforcing member 16 is preheated (heated) before being rolled. The preheating is performed by leaving the body to be rolled 18 in the air atmosphere with a range of 300° C. to 600° C. for 2 or more hours in a heating furnace. In the present embodiment, the preheating is performed for 2 or more hours at 500° C. The preheating atmosphere is not limited to performing in the air atmosphere. The preheating is preferably performed in an inert gas such as argon. The preheating is more preferably performed in a vacuum atmosphere of 5 Pa or less. At the preheating process, the body to be rolled 18 is heated so as to maintain the powder form of the mixed material M.

(Step S6: Rolling Process)

The rolling process performs plastic working, namely, rolling on the body to be rolled 18. The following first describes a situation in which a specific effect is given in the present embodiment in the body to be rolled 18.

Specifically, in the body to be rolled 18 to be subjected to rolling treatment at the rolling process, the mixed material M serving as an object to be rolled remains in a powder form and is not solidified at all. In other words, unlike conventional examples, the body to be rolled 18 is not preformed for the purpose of shape keeping, and specifically, is not preformed to a target shape by being subjected to press working, electric current pressure sintering, or the like before being subjected to the rolling. Although the body to be rolled 18 in the present embodiment is increased in filling ratio by the tapping, the filling ratio is insufficient for solidification, and the body to be rolled 18 is maintained in a powder form.

When the body to be rolled 18 is subjected to the rolling process, the mixed material M in a powder form is interposed between the aluminum case 10 (the lower case 12 and the upper case 14) from above and below. Specifically, the upper face of the mixed material M is tightly covered with the top plate 14E of the upper case 14 across the entire face, whereas the lower face of the mixed material M is tightly covered with the bottom plate 12E of the lower case 12 across the entire face. The body to be rolled 18 thus defines the "raw material" of a plate-shaped clad material as the three-layer clad structure that interposes the mixed material M by the aluminum plates from above and below with the mixed material M filled into the case 10 and sealed.

The preheated body to be rolled 18 is subjected to the rolling and is formed into a target shape. When the plate-shaped clad material is manufactured, a clad plate material having a certain clad ratio with an aluminum plate material or an aluminum container can be obtained by cold rolling alone. One piece of working can be performed by hot plastic working. A plurality of pieces of working may be combined together. After the hot plastic working, cold plastic working may be performed. When performing the cold plastic working, annealing at 300° C. to 600° C. (preferably 400° C. to 500° C.) before the working facilitates the working.

The body to be rolled 18 is aluminum-plate-clad, and on its surface there is no ceramic particle that serves as a starting point of breakage or wears a die or the like during the plastic working. For this reason, the aluminum composite material 100 having favorable rolling workability and excellent strength and surface properties can be obtained. An obtained hot plastically worked material has a metal-clad surface and good adhesion between the surface metals and the inside mixed material M and is more excellent in corrosion-resistance, impact-resistance, and heat conductivity than the aluminum composite material 100 having no metal-clad surface.

As another preferred embodiment, before performing the rolling, it is effective that the surface of the body to be rolled 18 is covered with a metallic protective plate such as a thin plate formed of SUS or copper. With this structure, fractures, cracks, or the like in the front-and-rear direction that may occur during the plastic working can be prevented.

More specifically, the rolling process is repeatedly performed 10 to 14 passes with a reduction ratio range of 10% to 70% to perform hot rolling. A rolling temperature in the hot rolling is set to 500° C.

A desired final thickness may be achieved by the hot rolling. After the hot rolling, warm rolling at the range of 200° C. to 300° C. may be performed. Furthermore, after the warm rolling, the second warm rolling at a temperature of 200° C. or less may be performed.

After the rolling process ends, a heat treatment process, that is, an annealing process is performed for a certain period of time at the range of 300° C. to 600° C. After the annealing process, a cooling process is performed, a correction process that performs correction to a desired degree of flatness is performed, and both side edges, a front end edge, and a rear end edge are cut off to form a certain product shape (the plate-shaped clad material as the aluminum composite material 100). After the rolling, annealing may be performed for a certain period of time at 450° C., for example.

In the present embodiment, the mixed material M serves as the matrix material 3, at least part of the upper case 14 serves as the metallic plate 1, and at least part of the lower case 12 serves as the metallic plate 2.

The embodiment has described an example in which the matrix material 3 is formed of the aluminum powder and the gadolinium oxide particles. When the matrix material 3 is formed of the aluminum powder, the gadolinium oxide particles, and the boron carbide particles, at the mixing process, the aluminum powder, the gadolinium oxide particles, and the boron carbide particles are mixed with each other. At the mixing process, the mixing is performed so that the mixed material M formed of the aluminum powder, the gadolinium oxide particles, and the boron carbide particles will contain the gadolinium oxide particles in an amount of 2% by mass or more and 10% by mass or less and the boron carbide particles in an amount of 10% by mass or more and 20% by mass or less.

Example 1

The following next describes Example 1 according to the present invention. As listed in Table 1, Table 2, and Table 3, samples (Sample 1 to Sample 13) of the aluminum composite material 100 having 13 respective matrix materials 3 of different compositions were prepared, and performances of each of those samples were evaluated. The compositions of the respective materials can be analyzed by ICP emission spectroscopic analysis.

TABLE 1

| | Composition of matrix material | | | | Tensile characteristics | | |
|---|---|---|---|---|---|---|---|
| | Al (% by mass) | $Gd_2O_3$ (% by mass) | $B_4C$ (% by mass) | Equivalent $B_4C$ concentration (% by mass) | Tensile strength (MPa) | 0.2% Yield strength (MPa) | Elongation (%) |
| Sample 1 | 94 | 6 | 0 | 30 | 152 | 96 | 16.7 |
| Sample 2 | 88 | 12 | 0 | 60 | 174 | 129 | 20.8 |
| Sample 3 | 85 | 15 | 0 | 75 | 180 | 131 | 12.6 |
| Sample 4 | 70 | 30 | 0 | 150 | 180 | 126 | 8.0 |
| Sample 5 | 90 | 0 | 10 | 10 | 157 | 123 | 10.6 |
| Sample 6 | 86 | 4 | 10 | 30 | 166 | 122 | 11.2 |
| Sample 7 | 80 | 10 | 10 | 60 | 171 | 127 | 8.1 |
| Sample 8 | 80 | 0 | 20 | 20 | 159 | 129 | 7.5 |
| Sample 9 | 78 | 2 | 20 | 30 | 169 | 131 | 8.5 |
| Sample 10 | 72 | 8 | 20 | 60 | 174 | 138 | 6.7 |
| Sample 11 | 60 | 20 | 20 | 120 | 171 | 139 | 2.1 |
| Sample 12 | 70 | 0 | 30 | 30 | 171 | 137 | 3.8 |
| Sample 13 | 40 | 0 | 60 | 60 | 64 | — | 0.7 |

TABLE 2

| | Bendability | | | | | | | | | | | |
|---|---|---|---|---|---|---|---|---|---|---|---|---|
| | R6 | | | | R9 | | | | R12 | | | |
| | 1 mm | 2 mm | 4 mm | 8 mm | 1 mm | 2 mm | 4 mm | 8 mm | 1 mm | 2 mm | 4 mm | 8 mm |
| Sample 1 | ○ | ○ | x | x | ○ | ○ | x | x | ○ | ○ | ○ | x |
| Sample 2 | ○ | ○ | x | x | ○ | ○ | ○ | x | ○ | ○ | ○ | x |
| Sample 3 | ○ | x | x | x | ○ | ○ | x | x | ○ | ○ | x | x |

TABLE 2-continued

| | Bendability | | | | | | | | | | | |
|---|---|---|---|---|---|---|---|---|---|---|---|---|
| | R6 | | | | R9 | | | | R12 | | | |
| | 1 mm | 2 mm | 4 mm | 8 mm | 1 mm | 2 mm | 4 mm | 8 mm | 1 mm | 2 mm | 4 mm | 8 mm |
| Sample 4 | ○ | x | x | x | ○ | x | x | x | ○ | ○ | x | x |
| Sample 5 | ○ | x | x | x | ○ | ○ | x | x | ○ | ○ | x | x |
| Sample 6 | ○ | x | x | x | ○ | ○ | x | x | ○ | ○ | x | x |
| Sample 7 | ○ | x | x | x | ○ | ○ | x | x | ○ | ○ | x | x |
| Sample 8 | x | x | x | x | ○ | x | x | x | ○ | x | x | x |
| Sample 9 | ○ | x | x | x | ○ | x | x | x | ○ | ○ | x | x |
| Sample 10 | x | x | x | x | ○ | x | x | x | ○ | ○ | x | x |
| Sample 11 | x | x | x | x | x | x | x | x | x | x | x | x |
| Sample 12 | x | x | x | x | x | x | x | x | x | x | x | x |
| Sample 13 | x | x | x | x | x | x | x | x | x | x | x | x |

TABLE 3

| | Bendability | | | | | | | |
|---|---|---|---|---|---|---|---|---|
| | R15 | | | | R20 | | | |
| | 1 mm | 2 mm | 4 mm | 8 mm | 1 mm | 2 mm | 4 mm | 8 mm |
| Sample 1 | ○ | ○ | ○ | x | ○ | ○ | ○ | ○ |
| Sample 2 | ○ | ○ | ○ | x | ○ | ○ | ○ | ○ |
| Sample 3 | ○ | ○ | ○ | x | ○ | ○ | ○ | x |
| Sample 4 | ○ | ○ | x | x | ○ | ○ | x | x |
| Sample 5 | ○ | ○ | x | x | ○ | ○ | ○ | x |
| Sample 6 | ○ | ○ | x | x | ○ | ○ | ○ | x |
| Sample 7 | ○ | ○ | x | x | ○ | ○ | x | x |
| Sample 8 | ○ | ○ | x | x | ○ | ○ | x | x |
| Sample 9 | ○ | ○ | x | x | ○ | ○ | x | x |
| Sample 10 | ○ | ○ | x | x | ○ | ○ | x | x |
| Sample 11 | x | x | x | x | x | x | x | x |
| Sample 12 | ○ | x | x | x | ○ | x | x | x |
| Sample 13 | x | x | x | x | x | x | x | x |

Table 1 lists compositions of the matrix materials 3 of the respective samples and equivalent $B_4C$ concentrations of the respective samples. Each of the samples includes the matrix material 3 having the corresponding composition listed in Table 1, and the metallic plate 1 and the metallic plate 2 formed of aluminum arranged so as to interpose the matrix material 3 therebetween.

Sample 1 to Sample 4, Sample 6, Sample 7, and Sample 9 to Sample 11 correspond to examples according to the present invention. Sample 1 to Sample 4 are samples the respective matrix materials 3 of which are formed of the aluminum powder (Al) and the gadolinium oxide particles ($Gd_2O_3$). Sample 6, Sample 7, and Sample 9 to Sample 11 are samples the respective matrix materials 3 of which are formed of the aluminum powder (Al), the gadolinium oxide particles ($Gd_2O_3$), and the boron carbide particles ($B_4C$). Sample 5, Sample 8, Sample 12, and Sample 13 are samples according to comparative examples, the respective matrix materials 3 of which do not contain the gadolinium oxide particles ($Gd_2O_3$).

As listed in Table 1, Sample 1 to Sample 4 are the samples the respective matrix materials 3 of which are formed of the aluminum powder (Al) and the gadolinium oxide particles ($Gd_2O_3$) and do not contain the boron carbide particles ($B_4C$). Sample 1 contains the gadolinium oxide particles in an amount of 6% by mass, Sample 2 contains the gadolinium oxide particles in an amount of 12% by mass, Sample 3 contains the gadolinium oxide particles in an amount of 15% by mass, and Sample 4 contains the gadolinium oxide particles in an amount of 30% by mass.

Sample 5 to Sample 7 are the samples the respective matrix materials 3 of which contain the boron carbide particles ($B_4C$) in an amount of 10% by mass. Sample 5 is the sample the matrix material 3 of which is formed of the aluminum powder (Al) and the boron carbide particles ($B_4C$) and does not contain the gadolinium oxide particles ($Gd_2O_3$). Sample 6 and Sample 7 are the samples the respective matrix materials 3 of which are formed of the aluminum powder (Al), the gadolinium oxide particles ($Gd_2O_3$), and the boron carbide particles ($B_4C$). Sample 6 contains the gadolinium oxide particles in an amount of 4% by mass, whereas Sample 7 contains the gadolinium oxide particles in an amount of 10% by mass.

Sample 8 to Sample 11 are the samples the respective matrix materials 3 of which contain the boron carbide particles ($B_4C$) in an amount of 20% by mass. Sample 8 is the sample the matrix material 3 of which is formed of the aluminum powder (Al) and the boron carbide particles ($B_4C$) and does not contain the gadolinium oxide particles ($Gd_2O_3$). Sample 9 to Sample 11 are the samples the respective matrix materials 3 of which are formed of the aluminum powder (Al), the gadolinium oxide particles ($Gd_2O_3$), and the boron carbide particles ($B_4C$). Sample 9 contains the gadolinium oxide particles in an amount of 2% by mass, Sample 10 contains the gadolinium oxide particles in an amount of 8% by mass, and Sample 11 contains the gadolinium oxide particles in an amount of 20% by mass.

Sample 12 and Sample 13 are the samples the respective matrix materials 3 of which are formed of the aluminum powder (Al) and the boron carbide particles ($B_4C$) and does not contain the gadolinium oxide particles ($Gd_2O_3$). Sample 12 and Sample 13 contain the boron carbide particles ($B_4C$) in large amounts; Sample 12 contains the boron carbide particles in an amount of 30% by mass, whereas Sample 13 contains the boron carbide particles in an amount of 60% by mass.

In Table 1, the equivalent $B_4C$ concentration is a relative value indicating thermal neutron absorbing power of each of the samples when the entire matrix material 3 is formed of the boron carbide particles and the thermal neutron absorbing power of this matrix material 3 is set to 100.

As evaluation tests, (1) a tensile test and (2) a bending test were performed. The tensile test was based on JIS-Z2241, and tensile strength (MPa), 0.2% yield strength (MPa), and elongation (%) were measured. The bending test was based on JIS-Z2248, and samples the respective thicknesses Da of the aluminum composite materials 100 of which were 1 mm, 2 mm, 4 mm, and 8 mm were prepared, and a 90-degree bending test was performed with a curvature radius of 6 mm (R6), 9 mm (R9), 12 mm (R12), 15 mm (R15), and 20 mm (R20).

Table 1 lists results (tensile characteristics) of the tensile test for the respective samples. Table 2 and Table 3 list results (bendability) of the bending test for the respective samples.

FIG. 14, FIG. 15, FIG. 16, FIG. 17, FIG. 18, FIG. 19, FIG. 20, FIG. 21, FIG. 22, and FIG. 23 are micrographs obtained by photographing Sample 1, Sample 2, Sample 3, Sample 4, Sample 6, Sample 7, Sample 9, Sample 10, Sample 11, and Sample 12, respectively, using an optical microscope at a 500-fold magnification. As illustrated in FIG. 14 through FIG. 22, it is seen that in the matrix materials 3 according to the present invention the neutron absorbing particles (the gadolinium oxide particles and the boron carbide particles) are uniformly dispersed in the aluminum powder.

The gadolinium oxide particles ($Gd_2O_3$) generally has about five times higher neutron absorbing power (thermal neutron absorbing power) than the boron carbide particles ($B_4C$). In other words, (it is expected that) the equivalent $B_4C$ concentration of Sample 4, which does not contain the boron carbide particles and contains the gadolinium oxide particles in an amount of 30% by mass, is 150% by mass.

As is seen from the elongation of the tensile characteristics of Sample 1 to Sample 4 and some other samples in Table 1, the aluminum composite material 100 having the matrix material 3 containing the gadolinium oxide particles ($Gd_2O_3$) has sufficient elongation. A general required specification value of elongation in a market through which neutron absorbing materials are distributed is 0.5% or more. Compared with the required specification value, the elongation of the aluminum composite material 100 having the matrix material 3 containing the gadolinium oxide particles ($Gd_2O_3$) is a higher value, and it is seen that it has sufficient elongation. The elongation of Sample 4, which does not contain the boron carbide particles and contains the gadolinium oxide particles in an amount of 30% by mass, is 8.0%, whereas the elongation of Sample 12, which does not contain the gadolinium oxide particles and contains the boron carbide particles in an amount of 30% by mass, is 3.8%, and it is seen that the matrix material 3 containing the gadolinium oxide particles ($Gd_2O_3$) elongates more sufficiently than the matrix material 3 containing the boron carbide particles ($B_4C$).

As is seen from Sample 1 to Sample 4 in Table 1, it has been found out that when the matrix material 3 is formed of the aluminum powder and the gadolinium oxide particles, in order to achieve the aluminum composite material 100 having sufficient neutron absorbing power (equivalent $B_4C$ concentration) and having sufficient tensile characteristics, the matrix material 3 preferably contains the gadolinium oxide particles in an amount of 6% by mass or more and 30% by mass or less. It is seen that containing the gadolinium oxide particles with this numerical range gives sufficient values not only for the elongation among the tensile characteristics but also for the tensile strength and the 0.2% yield strength.

The tensile strength in the market through which neutron absorbing materials are distributed is required to be 35 MPa or more as a general required specific value. As is seen from Table 1, compared with the required specific value, it is seen that Sample 1 to Sample 4 have sufficient tensile strength.

The 0.2% yield strength in the market through which neutron absorbing materials are distributed is required to be 15 MPa or more as a general required specific value. As is seen from Table 1, compared with the required specific value, it is seen that Sample 1 to Sample 4 have sufficient 0.2% yield strength.

As is seen from Sample 6, Sample 7, Sample 9, and Sample 10, it has been found out that when the matrix material 3 is formed of the aluminum powder, the gadolinium oxide particles, and the boron carbide particles, in order to achieve the aluminum composite material 100 having sufficient neutron absorbing power (equivalent $B_4C$ concentration) and having sufficient tensile characteristics, the matrix material 3 preferably contains the gadolinium oxide particles in an amount of 2% by mass or more and 10% by mass or less and the boron carbide particles in an amount of 10% by mass or more and 20% by mass or less. It is seen that containing the gadolinium oxide particles with this numerical range gives sufficient values not only for the elongation among the tensile characteristics but also for the tensile strength and the 0.2% yield strength.

Larger elongation gives better article workability, and it is seen that the aluminum composite material 100 according to the present invention has favorable workability.

When certain neutron absorbing power (equivalent $B_4C$ concentration) is attempted to be obtained, a tensile characteristic (elongation) may improve when the gadolinium oxide particles are contained and the boron carbide particles are not contained than when both the gadolinium oxide particles and the boron carbide particles are contained. As is seen from Sample 2 and Sample 7, for example, when an equivalent $B_4C$ concentration of 60% by mass is attempted to be obtained, the elongation of Sample 2, which does not contain the boron carbide particles, is 20.8%, whereas the elongation of Sample 7, which contains the boron carbide particles, is 8.1%. Thus, when sufficient elongation is attempted to be obtained while maintaining the neutron absorbing power, the content of the boron carbide particles is preferably lower.

Whether only the gadolinium oxide particles are contained or both the gadolinium oxide particles and the boron carbide particles are contained may be determined in consideration of required workability (tensile characteristics), required neutron absorbing power, manufacturing costs, or the like. In the present embodiment, it is determined that the matrix material 3 preferably contains the gadolinium oxide particles in an amount of 2% by mass or more and 10% by mass or less and the boron carbide particles in an amount of 10% by mass or more and 20% by mass or less in consideration of required tensile characteristics and the required specific values (the target tensile strength, the target 0.2% yield strength, and the target elongation).

In Table 2 and Table 3, "x" indicates a case (an NG case) when a fracture occurred at least in part of the aluminum composite material 100, whereas "◯" indicates a case (an OK case) when no fracture or the like occurred as a result of the bending test. As listed in Table 2 and Table 3, the bendability also varies depending on whether only the gadolinium oxide particles are contained or both the gadolinium oxide particles and the boron carbide particles are contained. The test results also vary in accordance with the thickness Da of the aluminum composite material 100. A smaller thickness Da gives a lower probability of NG. Given these circumstances, whether only the gadolinium oxide particles are contained or both the gadolinium oxide particles and the boron carbide particles are contained may be determined in consideration of required workability (bendability), required neutron absorbing performance, and the like.

As described above, it has been found out that the aluminum composite material 100 (the neutron absorbing material) according to the present embodiment exhibits remarkably higher values than the specific values required by the market in terms of its mechanical strength, has sufficient mechanical strength, and consequently, has high industrial applicability.

Example 2

The following next describes Example 2 according to the present invention. Example 2 demonstrates examples in which the evaluation tests were performed for a larger number of samples than those of Example 1. As listed in Table 4, Table 5, and Table 6, samples (Sample 1 to Sample 18) of the aluminum composite material 100 having 18 respective matrix materials 3 of different compositions were prepared, and performances of each of those samples were evaluated.

TABLE 4

| | Composition of matrix material | | | | Tensile characteristics | | | Formability |
|---|---|---|---|---|---|---|---|---|
| | Al (% by mass) | Gd$_2$O$_3$ (% by mass) | B$_4$C (% by mass) | Equivalent B$_4$C concentration (% by mass) | Tensile strength (MPa) | 0.2% Yield strength (MPa) | Elongation (%) | R/Da (minimum value) |
| Sample 1 | 94 | 6 | 0 | 30 | 152 | 96 | 16.7 | 2.5 |
| Sample 2 | 88 | 12 | 0 | 60 | 174 | 129 | 20.8 | 2.3 |
| Sample 3 | 85 | 15 | 0 | 75 | 180 | 131 | 12.6 | 3.8 |
| Sample 4 | 70 | 30 | 0 | 150 | 180 | 126 | 8.0 | 6 |
| Sample 14 | 92 | 8 | 0 | 40 | 177 | 136 | 77.4 | 2.5 |
| Sample 6 | 86 | 4 | 10 | 30 | 166 | 122 | 11.2 | 4.5 |
| Sample 7 | 80 | 10 | 10 | 60 | 171 | 127 | 8.1 | 6 |
| Sample 9 | 78 | 2 | 20 | 30 | 169 | 137 | 8.5 | 6 |
| Sample 10 | 72 | 8 | 20 | 60 | 174 | 138 | 6.7 | 7.5 |
| Sample 11 | 60 | 20 | 20 | 120 | 171 | 139 | 2.1 | >20 |
| Sample 15 | 75 | 5 | 20 | 45 | 173 | 133 | 7.1 | 7.5 |
| Sample 16 | 100 | 0 | 0 | 0 | 164 | 124 | 24.0 | 1.9 |
| Sample 5 | 90 | 0 | 10 | 10 | 157 | 123 | 10.6 | 4.5 |
| Sample 8 | 80 | 0 | 20 | 20 | 159 | 129 | 7.5 | 7.5 |
| Sample 12 | 70 | 0 | 30 | 30 | 171 | 137 | 3.8 | 15 |
| Sample 17 | 60 | 0 | 40 | 40 | 127 | 118 | 1.4 | >20 |
| Sample 18 | 50 | 0 | 50 | 50 | 102 | — | 1.0 | >20 |
| Sample 13 | 40 | 0 | 60 | 60 | 64 | — | 0.7 | >20 |

TABLE 5

| | Bendability | | | | | | | | | | | |
|---|---|---|---|---|---|---|---|---|---|---|---|---|
| | R6 | | | | R9 | | | | R12 | | | |
| | 1 mm | 2 mm | 4 mm | 8 mm | 1 mm | 2 mm | 4 mm | 8 mm | 1 mm | 2 mm | 4 mm | 8 mm |
| Sample 1 | o | o | x | x | o | o | x | x | o | o | o | x |
| Sample 2 | o | o | x | x | o | o | o | x | o | o | o | x |
| Sample 3 | o | x | x | x | o | o | x | x | o | o | x | x |
| Sample 4 | o | x | x | x | o | x | x | x | o | o | x | x |
| Sample 14 | o | o | x | x | o | o | x | x | o | o | o | x |
| Sample 6 | o | x | x | x | o | o | x | x | o | o | x | x |
| Sample 7 | o | x | x | x | o | x | x | x | o | o | x | x |
| Sample 9 | o | x | x | x | o | x | x | x | o | o | x | x |
| Sample 10 | x | x | x | x | o | x | x | x | o | x | x | x |
| Sample 11 | x | x | x | x | x | x | x | x | x | x | x | x |
| Sample 15 | x | x | x | x | o | x | x | x | o | x | x | x |
| Sample 16 | o | o | x | x | o | o | o | x | o | o | o | x |
| Sample 5 | o | x | x | x | o | o | x | x | o | o | o | x |
| Sample 8 | x | x | x | x | o | x | x | x | o | x | x | x |
| Sample 12 | x | x | x | x | x | x | x | x | x | x | x | x |
| Sample 17 | x | x | x | x | x | x | x | x | x | x | x | x |
| Sample 18 | x | x | x | x | x | x | x | x | x | x | x | x |
| Sample 13 | x | x | x | x | x | x | x | x | x | x | x | x |
| R/Da | 6 | 3 | 1.5 | 0.75 | 9 | 4.5 | 2.25 | 1.125 | 12 | 6 | 3 | 1.5 |

TABLE 6

| | Bendability | | | | | | | |
|---|---|---|---|---|---|---|---|---|
| | R15 | | | | R20 | | | |
| | 1 mm | 2 mm | 4 mm | 8 mm | 1 mm | 2 mm | 4 mm | 8 mm |
| Sample 1 | o | o | o | x | o | o | o | o |
| Sample 2 | o | o | o | x | o | o | o | o |
| Sample 3 | o | o | o | x | o | o | o | x |
| Sample 4 | o | o | x | x | o | o | x | x |
| Sample 14 | o | o | o | x | o | o | o | o |
| Sample 6 | o | o | x | x | o | o | o | x |
| Sample 7 | o | o | x | x | o | o | x | x |
| Sample 9 | o | o | x | x | o | o | x | x |
| Sample 10 | o | o | x | x | o | o | x | x |
| Sample 11 | x | x | x | x | x | x | x | x |
| Sample 15 | o | o | x | x | o | o | x | x |
| Sample 16 | o | o | o | o | o | o | o | o |
| Sample 5 | o | o | x | x | o | o | o | x |
| Sample 8 | o | o | x | x | o | o | x | x |
| Sample 12 | o | x | x | x | o | x | x | x |
| Sample 17 | x | x | x | x | x | x | x | x |
| Sample 18 | x | x | x | x | x | x | x | x |
| Sample 13 | x | x | x | x | x | x | x | x |
| R/Da | 15 | 7.5 | 3.75 | 1.875 | 20 | 10 | 5 | 2.5 |

Table 4 lists compositions of the matrix materials 3 of the respective samples and equivalent $B_4C$ concentrations of the respective samples. Each of the samples has the matrix material 3 having the corresponding composition listed in Table 4, and the metallic plate 1 and the metallic plate 2 formed of aluminum arranged so as to interpose the matrix material 3 therebetween.

Sample 1 to Sample 13 listed in Table 4, Table 5, and Table 6 are the same as Sample 1 to Sample 13 of Example 1. In Example 2, Sample 14 to Sample 18 are newly added and evaluation tests are performed thereon.

Sample 1 to Sample 4, Sample 14, Sample 6, Sample 7, Sample 9 to Sample 11, and Sample 15 correspond to examples according to the present invention.

Sample 1 to Sample 4 and Sample 14 are samples the respective matrix materials 3 of which are formed of the aluminum powder (Al) and the gadolinium oxide particles ($Gd_2O_3$) and do not contain the boron carbide particles ($B_4C$).

As listed in Table 4, Sample 1 contains the gadolinium oxide particles in an amount of 6% by mass. Sample 2 contains the gadolinium oxide particles in an amount of 12% by mass. Sample 3 contains the gadolinium oxide particles in an amount of 15% by mass. Sample 4 contains the gadolinium oxide particles in an amount of 30% by mass. Sample 14 contains the gadolinium oxide particles in an amount of 8% by mass.

Sample 6, Sample 7, Sample 9 to Sample 11, and Sample 15 are samples the respective matrix materials 3 of which are formed of the aluminum powder (Al), the gadolinium oxide particles ($Gd_2O_3$), and the boron carbide particles ($B_4C$).

As listed in Table 4, Sample 6 contains the gadolinium oxide particles in an amount of 4% by mass and contains the boron carbide particles in an amount of 10% by mass. Sample 7 contains the gadolinium oxide particles in an amount of 10% by mass and contains the boron carbide particles in an amount of 10% by mass. Sample 9 contains the gadolinium oxide particles in an amount of 2% by mass and contains the boron carbide particles in an amount of 20% by mass. Sample 10 contains the gadolinium oxide particles in an amount of 8% by mass and contains the boron carbide particles in an amount of 20% by mass. Sample 11 contains the gadolinium oxide particles in an amount of 20% by mass and contains the boron carbide particles in an amount of 20% by mass. Sample 15 contains the gadolinium oxide particles in an amount of 5% by mass and contains the boron carbide particles in an amount of 20% by mass.

Sample 16, Sample 5, Sample 8, Sample 12, Sample 17, Sample 18, and Sample 13 are samples according to comparative examples, the respective matrix materials 3 of which do not contain the gadolinium oxide particles ($Gd_2O_3$).

As listed in Table 4, Sample 16 is the sample the matrix material 3 of which contains neither the gadolinium oxide particles ($Gd_2O_3$) nor the boron carbide particles ($B_4C$).

Sample 5, Sample 8, Sample 12, Sample 17, Sample 18, and Sample 13 are the samples the respective matrix materials 3 of which are formed of the aluminum powder (Al) and the boron carbide particles ($B_4C$) and do not contain the gadolinium oxide particles ($Gd_2O_3$).

As listed in Table 4, Sample 5 contains the boron carbide particles in an amount of 10% by mass. Sample 8 contains the boron carbide particles in an amount of 20% by mass. Sample 12 contains the boron carbide particles in an amount of 30% by mass. Sample 17 contains the boron carbide particles in an amount of 40% by mass. Sample 18 contains the boron carbide particles in an amount of 50% by mass. Sample 13 contains the boron carbide particles in an amount of 60% by mass.

In Table 4, the equivalent $B_4C$ concentration is a relative value indicating thermal neutron absorbing power of each of the samples when the entire matrix material 3 is formed of the boron carbide particles and the thermal neutron absorbing power of this matrix material 3 is set to 100.

As the evaluation tests, (1) a tensile test and (2) a bending test were performed. Similarly to Example 1, the tensile test was based on JIS-Z2241, and tensile strength (MPa), 0.2% yield strength (MPa), and elongation (%) were measured. Similarly to Example 1, the bending test was based on JIS-Z2248, and samples the respective thicknesses Da of the aluminum composite materials 100 of which were 1 mm, 2 mm, 4 mm, and 8 mm were prepared, and a 90-degree bending test was performed with a curvature radius of 6 mm (R6), 9 mm (R9), 12 mm (R12), 15 mm (R15), and 20 mm (R20).

Table 4 lists results (tensile characteristics) of the tensile test and results (formability) of the bending test for the respective samples. Table 5 and Table 6 list results (bendability) of the bending test for the respective samples.

As is seen from the elongation of the tensile characteristics of Sample 1 to Sample 4, Sample 14, and some other samples in Table 4, the aluminum composite material 100 having the matrix material 3 containing the gadolinium oxide particles ($Gd_2O_3$) has sufficient elongation.

The elongation of Sample 14, which contains the gadolinium oxide particles in an amount of 8% by mass and does not contain the boron carbide particles, is 17.4%. The elongation of Sample 10, which contains the gadolinium oxide particles in an amount of 8% by mass and contains the boron carbide particles in an amount of 20% by mass, is 6.7%. It is seen that in the matrix material 3 containing the gadolinium oxide particles ($Gd_2O_3$) the matrix material 3 having a lower content of the boron carbide particles ($B_4C$) has more sufficient elongation than the matrix material 3 having a higher content of the boron carbide particles ($B_4C$).

As is seen from Sample 1 to Sample 4, Sample 14, and some other samples in Table 4, when the matrix material 3 is formed of the aluminum powder and the gadolinium oxide particles, in order to achieve the aluminum composite material 100 having sufficient neutron absorbing power (equivalent B$_4$C concentration) and having sufficient tensile characteristics, the matrix material 3 preferably contains the gadolinium oxide particles in an amount of 6% by mass or more and 30% by mass or less. It is seen that containing the gadolinium oxide particles with this numerical range gives sufficient values not only for the elongation among the tensile characteristics but also for the tensile strength and the 0.2% yield strength.

As is seen from Sample 6, Sample 7, Sample 9, Sample 10, Sample 11, Sample 15, and some other samples in Table 4, when the matrix material 3 is formed of the aluminum powder, the gadolinium oxide particles, and the boron carbide particles, in order to achieve the aluminum composite material 100 having sufficient neutron absorbing power (equivalent B$_4$C concentration) and having sufficient tensile characteristics, the matrix material 3 preferably contains the gadolinium oxide particles in an amount of 2% by mass or more and 20% by mass or less and contains the boron carbide particles in an amount of 10% by mass or more and 20% by mass or less. In this case, the minimum percentage elongation of the aluminum composite material 100 is 2.1% of Sample 11, and the percentage elongation of each of the other samples (Sample 6, Sample 7, Sample 9, Sample 10, and Sample 15) is 2.1% or more. In the examples listed in Table 4, 11.2% of Sample 6 is the maximum value. It is confirmed by the present example that the aluminum composite material 100 can be manufactured in which the matrix material 3 contains the gadolinium oxide particles in an amount of 2% by mass or more and 20% by mass or less and contains the boron carbide particles in an amount of 10% by mass or more and 20% by mass or less and that has a percentage elongation of about 2% or more (2.1% or more and 11.2% or less).

As is seen from Sample 6, Sample 7, Sample 9, Sample 10, Sample 15, and some other samples, when the matrix material 3 is formed of the aluminum powder, the gadolinium oxide particles, and the boron carbide particles, the matrix material 3 preferably contains the gadolinium oxide particles in an amount of 2% by mass or more and 10% by mass or less and contains the boron carbide particles in an amount of 10% by mass or more and 20% by mass or less. It is seen that containing the gadolinium oxide particles with this numerical range gives sufficient values not only for the elongation among the tensile characteristics but also for the tensile strength and the 0.2% yield strength.

In Table 5 and Table 6, "x" indicates a case (an NG case) when a fracture occurred at least in part of the aluminum composite material 100, whereas "∘" indicates a case (an OK case) when no fracture or the like occurred as a result of the bending test.

In the present example, for the evaluation of the formability of the aluminum composite material 100, a curvature radius R when no fracture occurred (the OK case) in the 90-degree bending test on the aluminum composite material 100 with the thickness Da was determined, and a ratio R/Da was determined to be an evaluation value. In other words, when a curvature radius and a thickness that cause no fracture in the 90-degree bending test are R and Da, respectively, the formability of the aluminum composite material 100 was represented by the ratio R/Da.

As listed in Table 5, the ratios R/Da in the 90-degree bending test on the aluminum composite materials 100 the respective thicknesses Da of which are 1 mm, 2 mm, 4 mm, and 8 mm so that the curvature radius R would be 6 mm are "6," "3," "1.5," and "0.75," respectively.

The ratios R/Da in the 90-degree bending test on the aluminum composite materials 100 the respective thicknesses Da of which are 1 mm, 2 mm, 4 mm, and 8 mm so that the curvature radius R would be 9 mm are "9," "4.5," "2.25," and "1.125," respectively.

The ratios R/Da in the 90-degree bending test on the aluminum composite materials 100 the respective thicknesses Da of which are 1 mm, 2 mm, 4 mm, and 8 mm so that the curvature radius R would be 12 mm are "12," "6," "3," and "1.5," respectively.

The ratios R/Da in the 90-degree bending test on the aluminum composite materials 100 the respective thicknesses Da of which are 1 mm, 2 mm, 4 mm, and 8 mm so that the curvature radius R would be 15 mm are "15," "7.5," "3.75," and "1.875," respectively.

The ratios R/Da in the 90-degree bending test on the aluminum composite materials 100 the respective thicknesses Da of which are 1 mm, 2 mm, 4 mm, and 8 mm so that the curvature radius R would be 20 mm are "20," "10," "5," and "2.5," respectively.

As listed in Table 5, in Sample 1, when the curvature radius R is 6 mm and the thickness Da is 1 mm or 2 mm, no fracture occurs, for example. The ratio R/Da when the curvature radius R is 6 mm and the thickness Da is 1 mm, which cause no fracture, is "6." The ratio R/Da when the curvature radius R is 6 mm and the thickness Da is 2 mm, which cause no fracture, is "3."

As listed in Table 5, in Sample 1, when the curvature radius R is 9 mm and the thickness Da is 1 mm or 2 mm, no fracture occurs. The ratio R/Da when the thickness Da is 1 mm and the curvature radius R is 9 mm, which causes no fracture, is "9." The ratio R/Da when the thickness Da is 2 mm and the curvature radius R is 9 mm, which causes no fracture, is "4.5."

As listed in Table 5, in Sample 1, when the curvature radius R is 12 mm and the thickness Da is 1 mm, 2 mm, or 4 mm, no fracture occurs. The ratio R/Da when the thickness Da is 1 mm and the curvature radius R is 12 mm, which causes no fracture, is "12." The ratio R/Da when the thickness Da is 2 mm and the curvature radius R is 12 mm, which causes no fracture, is "6." The ratio R/Da when the thickness Da is 4 mm and the curvature radius R is 12 mm, which causes no fracture, is "3."

As listed in Table 6, in Sample 1, when the curvature radius R is 15 mm and the thickness Da is 1 mm, 2 mm, or 4 mm, no fracture occurs. The ratio R/Da when the thickness Da is 1 mm and the curvature radius R is 15 mm, which causes no fracture, is "15." The ratio R/Da when the thickness Da is 2 mm and the curvature radius R is 15 mm, which causes no fracture, is "7.5." The ratio R/Da when the thickness Da is 4 mm and the curvature radius R is 15 mm, which causes no fracture, is "3.75."

As listed in Table 6, in Sample 1, when the curvature radius R is 20 mm and the thickness Da is 1 mm, 2 mm, 4 mm or 8 mm, no fracture occurs. The ratio R/Da when the thickness Da is 1 mm and the curvature radius R is 20 mm, which causes no fracture, is "20." The ratio R/Da when the thickness Da is 2 mm and the curvature radius R is 20 mm, which causes no fracture, is "10." The ratio R/Da when the thickness Da is 4 mm and the curvature radius R is 20 mm, which causes no fracture, is "5." The ratio R/Da when the thickness Da is 8 mm and the curvature radius R is 20 mm, which causes no fracture, is "2.5."

As described above, in Sample 1, when the curvature radius and the thickness that cause no fracture in the 90-degree bending test are R and Da, respectively, the ratios R/Da are "6," "3," "9," "4.5," "12," "6," "3," "15," "7.5," "3.75," "20," "10," "5," and "2.5." In the present example, a minimum value of a plurality of determined ratios R/Da is used as an evaluation value of the formability of the aluminum composite material 100. In Sample 1, when the curvature radius R is 20 mm and the thickness Da is 8 mm, the ratio R/Da indicates the minimum value "2.5" (refer to a shaded part in Table 6).

As listed in Table 5, in Sample 4, when the curvature radius R is 6 mm and the thickness Da is 1 mm, no fracture occurs, for example. The ratio R/Da when the thickness Da is 1 mm and the curvature radius R is 6 mm, which causes no fracture, is "6."

As listed in Table 5, in Sample 4, when the curvature radius R is 9 mm and the thickness Da is 1 mm, no fracture occurs. The ratio R/Da when the thickness Da is 1 mm and the curvature radius R is 9 mm, which causes no fracture, is "9."

As listed in Table 5, in Sample 4, when the curvature radius R is 12 mm and the thickness Da is 1 mm or 2 mm, no fracture occurs. The ratio R/Da when the thickness Da is 1 mm and the curvature radius R is 12 mm, which causes no fracture, is "12." The ratio R/Da when the thickness Da is 2 mm and the curvature radius R is 12 mm, which causes no fracture, is "6."

As listed in Table 6, in Sample 4, when the curvature radius R is 15 mm and the thickness Da is 1 mm or 2 mm, no fracture occurs. The ratio R/Da when the thickness Da is 1 mm and the curvature radius R is 15 mm, which causes no fracture, is "15." The ratio R/Da when the thickness Da is 2 mm and the curvature radius R is 15 mm, which causes no fracture, is "7.5."

As listed in Table 6, in Sample 4, when the curvature radius R is 20 mm and the thickness Da is 1 mm or 2 mm, no fracture occurs. The ratio R/Da when the thickness Da is 1 mm and the curvature radius R is 20 mm, which causes no fracture, is "20." The ratio R/Da when the thickness Da is 2 mm and the curvature radius R is 20 mm, which causes no fracture, is "10."

As described above, in Sample 4, when the curvature radius and the thickness that cause no fracture in the 90-degree bending test are R and Da, respectively, the ratios R/Da are "6," "9," "12," "6," "15," "7.5," "20," and "10." In the present example, a minimum value of a plurality of determined ratios R/Da is used as an evaluation value of the formability of the aluminum composite material 100. In Sample 4, when the curvature radius R is 6 mm and the thickness Da is 1 mm, the ratio R/Da indicates the minimum value "6" (refer to a shaded part in Table 5).

Sample 1 and Sample 4 have been described as examples. In the present example, the minimum values of the ratios R/Da are determined for all samples (Sample 1 to Sample 18) (refer to the shaded parts in Table 5 and Table 6). Table 4 lists the minimum values of the ratios R/Da of Sample 1 to Sample 18.

In the present example, the minimum value of the ratio R/Da of Sample 1 is "2.5." The minimum value of the ratio R/Da of Sample 2 is "2.25" (In Table 4, 2.25 is expressed as a round number 2.3). The minimum value of the ratio R/Da of Sample 3 is "3.75" (In Table 4, 3.75 is expressed as a round number 3.8). The minimum value of the ratio R/Da of Sample 4 is "6." The minimum value of the ratio R/Da of Sample 14 is "2.5." The minimum value of the ratio R/Da of Sample 6 is "4.5." The minimum value of the ratio R/Da of Sample 7 is "6." The minimum value of the ratio R/Da of Sample 9 is "6." The minimum value of the ratio R/Da of Sample 10 is "7.5." The minimum value of the ratio R/Da of Sample 11 is at least "20." The minimum value of the ratio R/Da of Sample 15 is "7.5." The minimum value of the ratio R/Da of Sample 16 is "1.875" (In Table 4, 1.875 is expressed as a round number 1.9). The minimum value of the ratio R/Da of Sample 5 is "4.5." The minimum value of the ratio R/Da of Sample 8 is "7.5." The minimum value of the ratio R/Da of Sample 12 is "15." The minimum value of the ratio R/Da of Sample 17 is at least "20." The minimum value of the ratio R/Da of Sample 18 is at least "20." The minimum value of the ratio R/Da of Sample 13 is at least "20."

As is seen in Sample 1 to Sample 4 and Sample 14 in Table 4, it is confirmed that when the matrix material 3 contains the gadolinium oxide particles in an amount of 6% by mass or more and 30% by mass or less, the aluminum composite material 100 that has a percentage elongation of about 8% or more (8.0% or more and 20.8% or less) and formability represented by the minimum value of the ratio R/Da of 2.3 or more and 6.0 or less can be manufactured, where the curvature radius and the thickness that cause no fracture are R and Da, respectively, in the 90-degree bending test.

As is seen in Sample 6, Sample 7, Sample 9, Sample 10, and Sample 15 in Table 4, it is confirmed that when the gadolinium oxide particles and the boron carbide particles are dispersed in the matrix material 3, the matrix material 3 contains the gadolinium oxide particles in an amount of 2% by mass or more and 10% by mass or less and contains the boron carbide particles in an amount of 10% by mass or more and 20% by mass or less, the aluminum composite material 100 that has a percentage elongation of about 6% or more (6.7% or more and 11.2% or less) and formability represented by the minimum value of the ratio R/Da of 4.5 or more and 7.5 or less can be manufactured, where the curvature radius and the thickness that cause no fracture are R and Da, respectively, in the 90-degree bending test.

As described above, according to the present embodiment, the gadolinium oxide particles are dispersed in the matrix material 3 formed of the aluminum powder, and therefore the aluminum composite material 100 that has neutron absorbing power and is excellent in workability and tensile characteristics can be provided. Both the gadolinium oxide particles and the boron carbide particles are dispersed in the matrix material 3, and therefore the aluminum composite material that has good balance among characteristics such as neutron absorbing power, workability, and manufacturing costs can be provided.

Gadolinium oxide particles are lower in price than gadolinium, for example, and are advantageous from the viewpoint of raw material costs. According to findings by the inventors of the present invention, it has been found out that addition of gadolinium oxide particles to aluminum powder in a process of a conventional method of casting may fail to uniformly disperse the gadolinium oxide particles and degrade the quality of articles to be manufactured. In the present embodiment, the aluminum powder and the gadolinium oxide particles are mixed with each other, the gadolinium oxide particles are uniformly dispersed in the aluminum powder, the mixed material M is interposed between the cases (the metallic plates) to form the body to be rolled 18, and the rolling is performed without a sintering process or the like, thereby forming the aluminum composite material 100 having the matrix material 3 in which the gadolinium oxide particles are uniformly dispersed in the aluminum powder. Thus, using the method of manufacture according to the present embodiment can manufacture the matrix material 3 in which the gadolinium oxide particles are uniformly dispersed in the aluminum powder, the particles being low in price and has excellent neutron absorbing power, and contributes to improvement in the quality of the aluminum composite material 100 to be manufactured. The gadolinium oxide particles can provide the aluminum composite material 100 excellent in workability.

In the present embodiment, the body to be rolled 18 is formed by filling the mixed material M into the case 10 and sealing the case 10 with the filling density of the mixed material M increased by tapping. The body to be rolled 18 has a structure that interposes the mixed material M in a powder form between the upper case 14 and the lower case 12. Consequently, the body to be rolled 18 is preheated and is subjected to the rolling, thereby manufacturing the aluminum composite material 100 as the clad material with the high filling density of the mixed material M maintained.

In the present embodiment, the upper face of the matrix material 3 (the mixed material M) of the clad structure and the metallic plate 1 (the upper case 14) are in intimate contact with each other, whereas the lower face of the matrix material 3 (the mixed material M) and the metallic plate 2 (the lower case 12) are in intimate contact with each other, and therefore the layers that are adjacent to each other are firmly joined together. Consequently, the mechanical strength of the aluminum composite material 100 dramatically increases. In the present embodiment, the surface of the aluminum composite material 100 is formed by the metallic plate 1 and the metallic plate 2, and there is no particle, whereby a favorable rolled material the surface of which is more resistant to breakage than existing sintered bodies can be obtained, for example.

In other words, as in conventional examples, when metallic powder containing much ceramic particles are subjected to sintering to form a sintered body, and the sintered body is subjected to plastic working, there is a strong tendency that, with a surface ceramic particle as a starting point of breakage, fractures occur in a plastically worked material. Another problem is that an extrusion die, a rolling roller, a forging die, or the like is worn. However, in the present embodiment, the surface of the aluminum composite material 100 is formed by the metallic plate 1 and the metallic plate 2, and there is no particle, whereby there is no ceramic particle that serves as a starting point of breakage or wears the die or the like on the surface unlike existing sintered bodies, for example. Thus, an effect of achieving a favorable rolled material is obtained.

In the present embodiment, the upper face (the upper case 14) and the lower face (the lower case 12) of the hollow case 10 function as the upper metallic plate 1 and the lower metallic plate 2 when constituting the clad material, and therefore the mixed material M is filled into the case 10 to complete the constitution as the clad material, which simplifies a manufacturing process. Furthermore, the mixed material M within the hollow case 10 is subjected to the rolling process as it is in the form of powder, and therefore a bulk density maintained with the mixed material M filled into the case 10 is only about 65% at most.

The various useful examples of the present invention have been demonstrated and described. It is understood that the present invention is not limited to the various examples and modifications and can be modified in various ways within the scope not departing from the essence of the present invention and the description of the attached claims.

REFERENCE SIGNS LIST

1 Metallic plate
2 Metallic plate
3 Matrix material
10 Case
12 Lower case
14 Upper case
18 Body to be rolled
100 Aluminum composite material

The invention claimed is:

1. An aluminum composite material comprising:
a first metallic plate;
a second metallic plate; and
a matrix material that is interposed between the first metallic plate and the second metallic plate and is formed of aluminum powder, wherein
the matrix material contains gadolinium oxide particles in an amount of 6% by mass or more and 15% by mass or less, and
the aluminum composite material has a percentage elongation of 12.6% or more and 20.8% or less.

2. An aluminum composite material comprising:
a first metallic plate;
a second metallic plate; and
a matrix material that is interposed between the first metallic plate and the second metallic plate and is formed of aluminum powder, wherein
the matrix material contains gadolinium oxide particles in an amount of 2% by mass or more and 20% by mass or less and contains boron carbide particles in an amount of 10% by mass or more and 20% by mass or less, and
the aluminum composite material has a 0.2% yield strength of 127 MPa or more and 139 MPa or less.

3. An aluminum composite material comprising:
a first metallic plate;
a second metallic plate; and
a matrix material that is interposed between the first metallic plate and the second metallic plate and is formed of aluminum powder, wherein
the matrix material contains gadolinium oxide particles in an amount of 2% by mass or more and 10% by mass or less and contains boron carbide particles in an amount of 10% by mass or more and 20% by mass or less, and
the aluminum composite material has a percentage elongation of 6.7% or more and 11.2% or less.

* * * * *